(12) United States Patent
Iwai et al.

(10) Patent No.: US 10,826,653 B2
(45) Date of Patent: Nov. 3, 2020

(54) BASE STATION, TERMINAL, AND COMMUNICATION METHOD

(71) Applicant: Panasonic Intellectual Property Corporation of America, Torrance, CA (US)

(72) Inventors: Takashi Iwai, Ishikawa (JP); Hidetoshi Suzuki, Kanagawa (JP); Ayako Horiuchi, Kanagawa (JP); Lilei Wang, Beijing (CN); Joachim Loehr, Wiesbaden (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/320,922

(22) PCT Filed: Aug. 11, 2016

(86) PCT No.: PCT/CN2016/094622
§ 371 (c)(1),
(2) Date: Jan. 25, 2019

(87) PCT Pub. No.: WO2018/027795
PCT Pub. Date: Feb. 15, 2018

(65) Prior Publication Data
US 2019/0165891 A1    May 30, 2019

(51) Int. Cl.
*H04W 72/12* (2009.01)
*H04L 1/00* (2006.01)
*H04L 1/18* (2006.01)
*H04L 5/00* (2006.01)
*H04L 27/26* (2006.01)
*H04L 27/38* (2006.01)
*H04W 72/04* (2009.01)

(52) U.S. Cl.
CPC .......... *H04L 1/0083* (2013.01); *H04L 1/1819* (2013.01); *H04L 1/1861* (2013.01);
(Continued)

(58) Field of Classification Search
CPC ... H04L 1/0083; H04L 5/0055; H04L 1/1893; H04L 1/1861; H04L 27/38;
(Continued)

(56) References Cited

U.S. PATENT DOCUMENTS

2016/0020891 A1   1/2016  Jung et al.
2017/0111160 A1*  4/2017  Chen ................. H04W 72/0446
(Continued)

FOREIGN PATENT DOCUMENTS

EP    3 054 616 A1    8/2016
EP    3 493 449 A1    6/2019

OTHER PUBLICATIONS

3GPP TSG RAN WG1 Meeting #85 Nanjing, P. R. China May 23-27, 2016 (R1-165176) ; NOTE: Applicant provided NPL document (Year: 2016).*
(Continued)

*Primary Examiner* — Edan Orgad
*Assistant Examiner* — Malick A Sohrab
(74) *Attorney, Agent, or Firm* — Seed IP Law Group LLP

(57) ABSTRACT

A self-contained operation using a time-unit configuration taking into consideration HARQ processes is performed. In base station, transmission section transmits a downlink signal in a downlink transmission region in a time unit composed of the downlink transmission region, an uplink transmission region, and a gap interval that is a switching point from the downlink transmission region to the uplink transmission region; and reception section receives an uplink signal in the uplink transmission region in the time unit. Each time unit includes the downlink transmission region and the uplink transmission region for each of HARQ processes.

14 Claims, 16 Drawing Sheets

(52) U.S. Cl.
CPC .......... *H04L 1/1893* (2013.01); *H04L 5/0055* (2013.01); *H04L 27/2605* (2013.01); *H04L 27/38* (2013.01); *H04W 72/0413* (2013.01); *H04L 1/1854* (2013.01); *H04L 1/1887* (2013.01); *H04L 5/0007* (2013.01); *H04L 5/0016* (2013.01)

(58) Field of Classification Search
CPC . H04L 27/2605; H04L 1/1819; H04L 5/0016; H04L 1/1854; H04L 5/0007; H04L 1/1887; H04W 72/0413
See application file for complete search history.

(56) References Cited

U.S. PATENT DOCUMENTS

| | | | | |
|---|---|---|---|---|
| 2017/0171879 | A1* | 6/2017 | Jiang | H04W 72/1273 |
| 2018/0097606 | A1* | 4/2018 | Toledano | H04L 1/1854 |
| 2019/0069164 | A1* | 2/2019 | Kishiyama | H04W 72/0413 |
| 2019/0069289 | A1* | 2/2019 | Kishiyama | H04W 74/0833 |

OTHER PUBLICATIONS

International Search Report, dated Apr. 28, 2017, for corresponding International Application No. PCT/CN2016/094622, 2 pages.

LG Electronics et al., "WF on minimum HARQ Timing," R1-165887, Agenda Item: 7.1.4, 3GGP TSG RAN WG1 Meeting #85, Nanjing, China, May 23-27, 2016, 4 pages.

Panasonic et al., "WF on Scalable Numerology Symbol Boundary Alignment," R1-165886, Agenda Item: 7.1.4, 3GPP TSG RAN WG1 #85, Nanjing, China, May 23-27, 2016, 2 pages.

Qualcomm et al., "WF on Frame Structure and Evaluation," R1-165990 (Revised to R1-166027), Agenda Item: 7.1.4, 3GPP TSG RAN WG1 #85, Nanjing, China, May 23-27, 2016, 2 pages.

NTT Docomo, Inc., "Discussion on frame structure for NR," R1-165176, Agenda Item 7.1.4, 3GPP TSG RAN WG1 Meeting #85, Nanjing, P.R. China, May 23-27, 2016, 9 pages.

Extended European Search Report, dated Jul. 17, 2019, for European Application No. 16912250.4-1219, 11 pages.

* cited by examiner

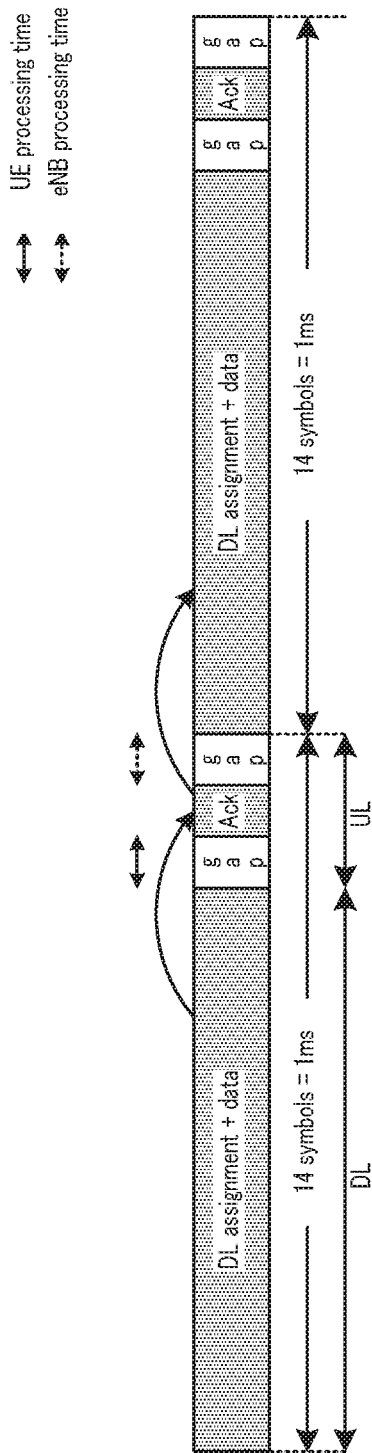
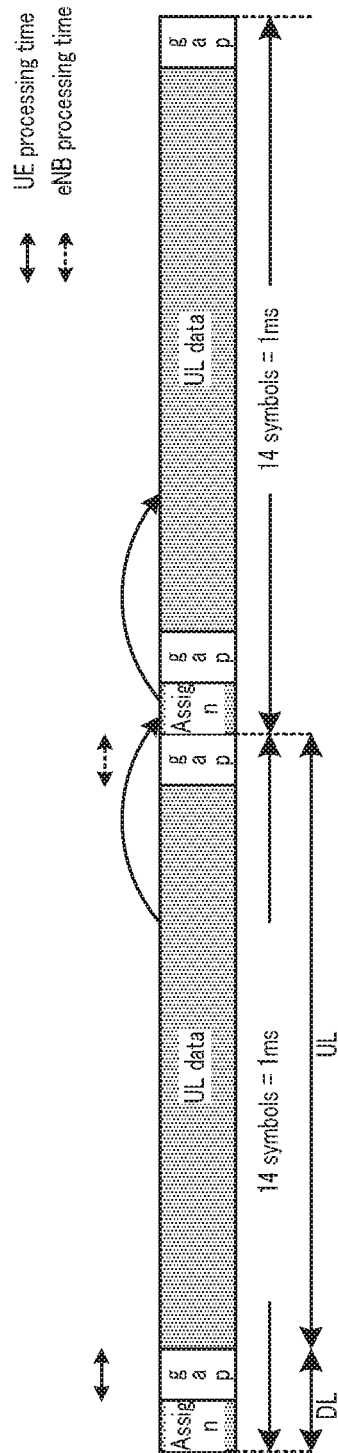
FIG. 1A
FIG. 1B

| DL self-contained | [symbol] |
|---|---|
| DL assignment | 1 |
| DL data | 10 |
| 1st gap | 1 |
| ACK | 1 |
| 2nd gap | 1 |

FIG. 2A

| UL self-contained | [symbol] |
|---|---|
| UL assignment | 1 |
| 1st gap | 1 |
| UL data | 11 |
| 2nd gap | 1 |

FIG. 2B

BASE STATION, TERMINAL, AND COMMUNICATION METHOD

BACKGROUND

Technical Field

The present disclosure relates to a base station, a terminal, and a communication method.

Description of the Related Art

In downlink communication of mobile communication, a base station (may be referred to as "eNB" or "gNB") transmits to a terminal (may be referred to as "User Equipment (UE)") a control signal for the terminal to receive data, in general. The terminal decodes control information transmitted to the terminal using the received control signal to acquire information about frequency allocation or adaptive control or the like required for data reception. The terminal receives data from the base station using a radio resource indicated by the decoded control information.

In uplink communication of mobile communication, a base station transmits to a terminal a control signal for the terminal to transmit data in general. The terminal decodes the control information transmitted to the terminal using the received control signal to acquire information about frequency allocation or adaptive control required for data transmission. The terminal generates data in accordance with the decoded control information and transmits the data to the base station using the indicated radio resource.

In mobile communication, a hybrid automatic repeat request (HARQ) is applied to downlink data in general. In other words, the terminal feeds back a response signal indicating an error detection result on the downlink data to the base station.

HARQ is applied to uplink data as well in mobile communication, likewise. In other words, the base station feeds back a response signal indicating an error detection result on the uplink data to the terminal. Alternatively, the base station transmits a control signal to the terminal at an optional timing to cause the terminal to retransmit the data.

Incidentally, with the recent spread of services using mobile broadband, the data traffic in mobile communication has been exponentially increasing. For this reason, the expansion of data transmission capacity for the upcoming feature has been considered an urgent task. In addition, drastic advancements in Internet of Things (IoT) in which any kind of "things" are connected together via the Internet are expected in the years to come.

In order to support diversification of services with IoT, exponential advancements are required not only in the data transmission capacity but also in various requirements such as low latency and communication areas (coverage). With this background in mind, technical development and standardization of the $5^{th}$ generation mobile communication systems (5G) have been made, which significantly improves the performances and features as compared with the $4^{th}$ generation mobile communication systems (4G).

Long Term Evolution (LTE)-Advanced, which has been standardized by 3GPP, is known as a 4G Radio Access Technology (RAT). 3GPP has been making the technical development of a new RAT (NR) not necessarily having backward compatibility with LTE-Advanced in the standardization of 5G.

In NR, as a time-unit configuration (frame configuration) achieving low latency, which is one of 5G requirements, studies have been carried out on a constant time interval time unit containing a "DL transmission region," "Guard region (may be called a non-radio transmission interval or gap interval)," and "UL transmission region" (e.g., one subframe, NR subframe, or fixed time length (such as 1 ms), and time length containing a predetermined number of OFDM symbols) (e.g., see Non-Patent Literature (hereinafter, referred to as "NPL") 1). The operation performed in this time unit is called a "self-contained operation."

Furthermore, studies have been carried out on a "DL self-contained" operation for achieving low latency in downlink communication and a "UL self-contained" operation for achieving low latency in uplink communication using the above described time unit. In the DL self-contained operation, the base station transmits the control signal required for the terminal to receive downlink data (DL assignment), and DL data assigned by the control signal in the DL transmission region, while the terminal transmits a response signal for the DL data and an uplink control signal (UCI: Uplink Control Indicator) in the UL transmission region. In addition, in the UL self-contained operation, the base station transmits a control signal required for the terminal to transmit UL data (UL assignment), and the terminal transmits the UL data assigned by the control signal, and UCI.

Moreover, in NR, as a time-unit configuration achieving low latency, reducing the time interval from transmission of a response signal to transmission of retransmission data as much as possible is required (e.g., see, NPL 2).

In NR, it has been agreed that studies are to be carried out based on the time-unit configuration containing 14 symbols (OFDM symbols) per ms with a subcarrier interval of 15 kHz as in the LTE subframe configuration (e.g., see, NPL 3).

CITATION LIST

Non-Patent Literature

NPL 1

R1-166027, Qualcomm, Panasonic, NTT DOCOMO, KT Corp, MediaTek, Intel, "WF on Frame Structure and Evaluation," 3GPP TSG RAN WG1#85, May 2016

NPL 2

R1-165887, LG Electronics, Panasonic, Qualcomm, NTT DOCOMO, "WF on minimum HARQ Timing," 3GPP TSG RAN WG1#85, May 2016

NPL3

R1-165886, Panasonic, Intel, Samsung, NTT DOCOMO, Qualcomm, Huawei, MediaTek, "WF on Scalable Numerology Symbol Boundary Alignment," 3GPP TSG RAN WG1#85, May 2016

BRIEF SUMMARY

Regarding the time-unit configuration using the self-contained operation, control using an HARQ process has not been studied enough, however.

An aspect of this disclosure is to provide a base station, a terminal, and a communication method capable of performing a self-contained operation using a time-unit configuration taking HARQ processes into consideration.

A base station according to an aspect of the present disclosure includes: a transmission section that transmits a downlink signal in a downlink transmission region in a time unit composed of the downlink transmission region, an uplink transmission region, and a gap interval that is a switching point from the downlink transmission region to the uplink transmission region; and a reception section that receives an uplink signal in the uplink transmission region in the time unit, in which the time unit includes the downlink transmission region and the uplink transmission region for each of a plurality of HARQ processes.

A terminal according to an aspect of the present disclosure includes: a reception section that receives a downlink signal in a downlink transmission region in a time unit composed of the downlink transmission region, an uplink transmission region, and a gap interval that is a switching point from the downlink transmission region to the uplink transmission region; and a transmission section that transmits an uplink signal in the uplink transmission region in the time unit, in which the time unit includes the downlink transmission region and the uplink transmission region for each of a plurality of HARQ processes.

A communication method according to an aspect of the present disclosure includes: transmitting a downlink signal in a downlink transmission region in a time unit composed of the downlink transmission region, an uplink transmission region, and a gap interval that is a switching point from the downlink transmission region to the uplink transmission region; and receiving an uplink signal in the uplink transmission region in the time unit, in which the time unit includes the downlink transmission region and the uplink transmission region for each of a plurality of HARQ processes.

A communication method according to an aspect of the present disclosure includes: receiving a downlink signal in a downlink transmission region in a time unit composed of the downlink transmission region, an uplink transmission region, and a gap interval that is a switching point from the downlink transmission region to the uplink transmission region; and transmitting an uplink signal in the uplink transmission region in the time unit, in which the time unit includes the downlink transmission region and the uplink transmission region for each of a plurality of HARQ processes.

Note that the comprehensive or specific aspects mentioned above may be implemented by a system, apparatus, method, integrated circuit, computer program, or recoding medium, or any combination of the system, apparatus, method, integrated circuit, computer program, and recoding medium.

According to an aspect of this disclosure, a self-contained operation using a time-unit configuration taking HARQ processes into consideration can be performed.

The specification and drawings reveal more advantages and effects in an aspect of this disclosure. Such advantages and/or effects are provided by the features disclosed in several embodiments as well as the specification and drawings, but all of them do not have to be necessarily provided in order to obtain one or more identical features.

BRIEF DESCRIPTION OF THE SEVERAL VIEWS OF THE DRAWINGS

FIG. 1A is a diagram illustrating a time-unit configuration example at the time of a DL self-contained operation;

FIG. 1B is a diagram illustrating a time-unit configuration example at the time of a UL self-contained operation;

FIG. 2A is a diagram illustrating an example of a symbol length of each region in a time unit at the time of a DL self-contained operation;

FIG. 2B is a diagram illustrating an example of a symbol length of each region in a time unit at the time of a UL self-contained operation;

DETAILED DESCRIPTION

Background to the Present Disclosure

Figure 3:
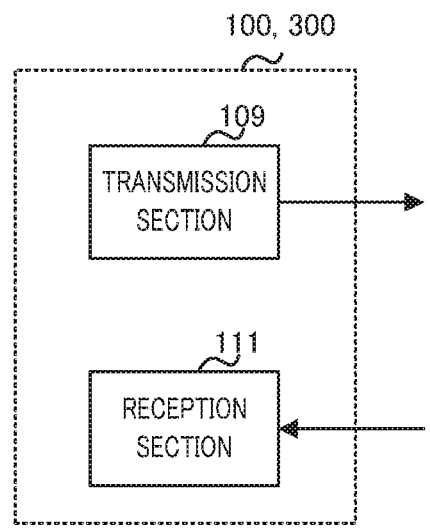
FIG. 3 is a block diagram illustrating a main configuration of a base station according to the present disclosure.

Hereinafter, a description will be given of the background to the present disclosure.

The configurations illustrated in FIGS. 1A and 1B have been under study as a time-unit configuration capable of a self-contained operation in a time division duplex (TDD) system (e.g., see NPL 2). FIG. 1A illustrates a time-unit configuration capable of a DL self-contained operation while FIG. 1B illustrates a time-unit configuration capable of a UL self-contained operation.

A gap (gap mapped first within each time unit of 1 ms in FIGS. 1A and 1B) between a DL transmission region (intervals indicated as "DL" in FIGS. 1A and 1B) and a UL transmission region (intervals indicated as "UL" in FIGS. 1A and 1B) is configured taking into consideration a propagation delay time between a base station and a terminal, and processing time of the terminal (UE processing time). The UE processing time herein indicates a processing time for the terminal to decode DL data and generate a response signal (Ack) in case of a DL self-contained operation (FIG. 1A) and indicates a processing time for the terminal to decode a control signal (UL assignment) and generate UL data in case of a UL self-contained operation (FIG. 1B).

In addition, the gap at the end of the UL transmission region (gap to be mapped second in each time unit of 1 ms in FIGS. 1A and 1B) is configured taking into consideration a processing time of the base station (eNB processing time). The eNB processing time herein indicates a processing time for the base station to decode a response signal and generate the next time unit scheduling and a control signal (DL assignment) in case of a DL self-contained operation and indicates the processing time for the base station to decode UL data and generate the next time unit scheduling and a control signal (UL assignment) in case of a UL self-contained operation.

The average delay time (average latency) of the time-unit configuration illustrated in FIGS. 1A and 1B is estimated as follows.

Note that, as illustrated in FIG. 2A, a time-unit configuration of 14 symbols per ms is assumed in the DL self-contained operation of FIG. 1A. In this time-unit configuration, the symbol length of DL assignment+DL data is 11 symbols, the symbol length of the first gap is one symbol, the symbol length of ACK (response signal) is one symbol, and the symbol length of the second gap is one symbol.

In this case, the average latency from generation of a transmission buffer of a base station to reception of a response signal for the DL data by the base station from the terminal is 14/2 symbols (average time from buffer generation to DL data assignment)+13 symbols (time from DL data assignment to reception of ACK)=20 symbols.

Moreover, as illustrated in FIG. 2B, a time-unit configuration of 14 symbols per ms is assumed in the UL self-contained operation of FIG. 1B. In this time-unit configuration, the symbol length of UL assignment is one symbol, the symbol length of the first gap is one symbol, the symbol length of UL data is 11 symbols, and the symbol length of the second gap is one symbol.

In this case, the average latency from generation of a transmission buffer of a terminal to completion of the initial UL data transmission from the terminal is 14/2 symbols (average time from buffer generation to UL data transmission)+14 symbols (time for scheduling request in UL data)+13 symbols (time from reception of radio resource allocation information by the terminal to completion of the UL data transmission)=34 symbols.

Moreover, in the assumption illustrated in FIGS. 2A and 2B, the overhead for the gap intervals of the time-unit configuration is 2/14=14% in both FIGS. 1A and 1B.

The processing time allowed in the assumed time-unit configuration illustrated in FIGS. 2A and 2B is one symbol for the processing time of the terminal and one symbol for the processing time of the base station in both FIGS. 1A and 1B.

In the time-unit configuration illustrated in FIGS. 1A and 1B, provision of a gap interval taking into consideration the processing time of the base station at the end of the time unit allows for data retransmission in the next time unit, so that latency in data communication can be reduced.

However, regarding the time-unit configuration used in the self-contained operation illustrated in FIGS. 1A and 1B, studies on control using an HARQ process have not been carried out enough. For this reason, when multiple HARQ processes are applied in each time unit, depending on the configuration of the HARQ process, performance degradation such as an increase in overhead for gap intervals, an increase in average latency, or shortening of processing time allowed for the terminal and base station may occur.

In this respect, an aspect of the present disclosure is to improve the performance mentioned above by the time-unit configuration for the self-contained operation taking HARQ processes into account.

Hereinafter, a detailed description will be given of embodiments of the present disclosure with reference to the accompanying drawings.

Summary of Communication System

A communication system that performs a DL self-contained operation according to each embodiment of the present disclosure includes base station 100 and terminal 200. Moreover, a communication system that performs a UL self-contained operation according to each embodiment of the present disclosure includes base station 300 and terminal 400.

Hereinafter, a description will be given, assuming a TDD system. However, an aspect of the present disclosure can be applied in a similar manner to an FDD system to be described hereinafter.

In addition, a single eNB may include the configurations of both base stations 100 and 300, or may include any one of the configurations thereof. Likewise, a single UE may include the configurations of both terminals 200 and 400, or may include any one of the configurations thereof.

FIG. 3 is a block diagram illustrating a main configuration of base stations 100 and 300 according to each embodiment of the present disclosure. In base stations 100 and 300 illustrated in FIG. 3, transmission section 109 transmits a DL signal in a DL transmission region in a time unit composed of the DL transmission region, a UL transmission region, and a gap interval, which is a switching point from the DL transmission region to the UL transmission region, while reception section 111 receives a UL signal in the UL transmission region in the time unit.

Figure 4:
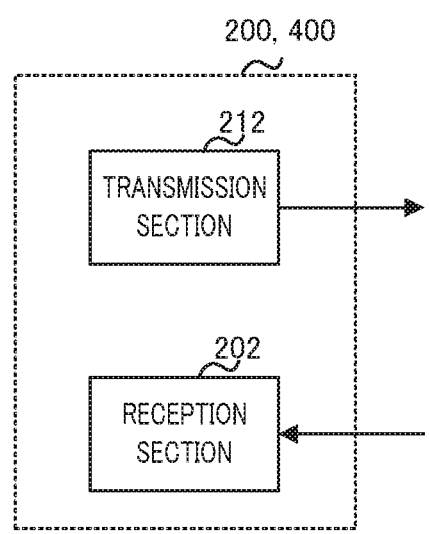
FIG. 4 is a block diagram illustrating a main configuration of a terminal according to the present disclosure.

FIG. 4 is a block diagram illustrating a main configuration of terminals 200 and 400 according to each embodiment of the present disclosure. In terminals 200 and 400 illustrated in FIG. 4, reception section 202 receives a DL signal in a DL transmission region in a time unit composed of the DL transmission region, a UL transmission region, and a gap interval, which is a switching point from the DL transmission region to the UL transmission region, while transmission section 212 receives a UL signal in the UL transmission region in the time unit.

Each time unit includes the DL transmission regions and the UL transmission regions for multiple HARQ processes.

Embodiment 1

Configuration of Base Station (At DL Self-Contained Operation)

Figure 5:
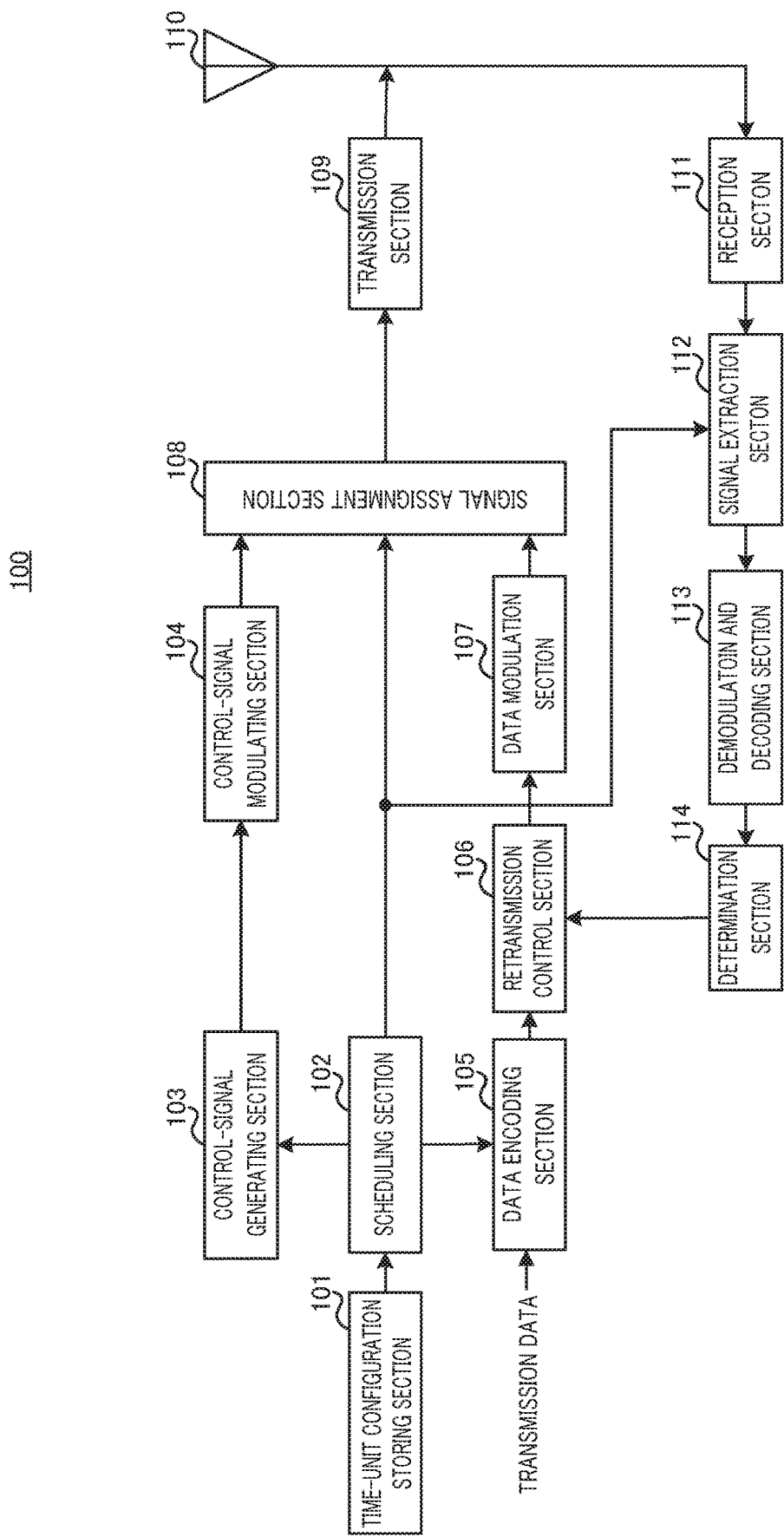
FIG. 5 is a block diagram illustrating a configuration of the base station at the time of a DL self-contained operation according to Embodiment 1.

FIG. 5 is a block diagram illustrating a configuration of base station 100 that performs a DL self-contained operation according to Embodiment 1. In FIG. 5, base station 100 includes time-unit configuration storing section 101, scheduling section 102, control-signal generating section 103, control-signal modulating section 104, data encoding section 105, retransmission control section 106, data modulation section 107, signal assignment section 108, transmission section 109, antenna 110, reception section 111, signal extraction section 112, demodulation and decoding section 113, and determination section 114.

Base station 100 illustrated in FIG. 5 transmits DL assignment and DL data in a DL transmission region in a time unit composed of "DL transmission region," "UL transmission region" and "gap interval," which is a switching point from the DL transmission region to the UL transmission region (self-contained time unit). Furthermore, base station 100 receives a response signal including an ACK/NACK (UCI may be further included) transmitted from terminal 200 in the UL transmission region in the time unit.

In base station 100, time-unit configuration storing section 101 previously stores a time-unit configuration including multiple HARQ processes. In case of a DL self-contained time unit, time-unit configuration storing section 101 stores signal mapping in the regions including a DL transmission region (including DL assignment and DL data), a gap interval (Gap) and a UL transmission region (including ACK) for each HARQ process number (HARQ process). Time-unit configuration storing section 101 outputs the time-unit configuration stored therein to scheduling section 102. Note that, a detailed description will be hereinafter given of the time-unit configuration including multiple HARQ processes stored in time-unit configuration storing section 101.

Scheduling section 102 determines, for terminal 200, scheduling information about DL assignment and DL data in the DL self-contained time unit (e.g., ID of allocation terminal, allocation resource information (frequency, time, coding resource and/or the like) to terminal 200, DL-data modulation and coding scheme, response-signal allocation resource information, retransmission control information (New data Indicator, Redundancy Version and/or the like).

Scheduling section 102 determines time resource allocation in the time unit based on the signal mapping of DL assignment, DL data, Gap, and ACK for each HARQ process number in the time unit outputted from time-unit configuration storing section 101. Moreover, scheduling section 102 applies an optional HARQ process number when assigning a new packet to terminal 200 and applies the HARQ process number of the last transmission when assigning a retransmission packet to terminal 200.

The number of HARQ processes to be applied within a single time unit is determined by scheduling section 102 in accordance with a predetermined rule. For example, scheduling section 102 determines the number of HARQ processes taking into consideration a DL data size or the like of the allocation terminal. Regarding the updating frequency of the number of HARQ processes, the number of HARQ processes may be updated semi-statically taking into consideration transmission buffer size information or the like of the terminal under coverage, and the determined number of HARQ processes may be indicated to terminal 200 using a broadcast channel. Alternatively, the number of HARQ processes may be dynamically updated (for every time unit) and indicated to terminal 200 using DL assignment. Alternatively, the number of HARQ processes may be a fixed value previously defined by design.

Note that, the signal mapping of each HARQ process number in the time unit is fixed, so that terminal 200 (reception side) can uniquely know the HARQ process number from the signal mapping in the time unit when synchronization of the time unit is successful. Thus, base station 100 does not have to indicate the HARQ process number to terminal 200 by including the HARQ process number in DL assignment.

Scheduling section 102 outputs scheduling information to control-signal generating section 103, data encoding section 105, signal assignment section 108 and signal extraction section 112.

Control-signal generating section 103 generates a control signal (DL assignment) intended for terminal 200. DL assignment includes a cell-specific higher-layer signal, a group or RAT-specific higher-layer signal, a terminal-specific higher-layer signal, DL-data allocation resource information, response-signal allocation resource information, retransmission control information and/or the like. Note that, the response-signal allocation resource (frequency, time, and coding) may be previously configured by base station 100 for terminal 200 via higher-layer signaling or the like. Moreover, when the response-signal allocation resource is determined indirectly in accordance with the predetermined rule from DL-data allocation resources or the like, the response-signal allocation resource information does not have to be included in a DL assignment signal. Control-signal generating section 103 generates a control information bit sequence using these pieces of control information, encodes the generated control information bit sequence, and outputs the encoded control signal to control-signal modulating section 104.

Control-signal modulating section 104 modulates DL assignment received from control-signal generating section 103 and outputs the modulated DL assignment to signal assignment section 108.

Data encoding section 105 performs error correction coding on DL data (transmission data) in accordance with the coding scheme received from scheduling section 102 and outputs the encoded DL data to retransmission control section 106.

Retransmission control section 106 holds the encoded DL data received from data encoding section 105 and also outputs the encoded DL data to data modulation section 107 at the time of the initial transmission. Moreover, retransmission control section 106 controls the held data based on the determination result from determination section 114 at the time of retransmission. More specifically, upon reception of a NACK for the DL data, retransmission control section 106 outputs the corresponding held data to data modulating section 107. Meanwhile, upon reception of an ACK for the DL data, retransmission control section 106 discards the corresponding held data and ends DL data transmission.

Data modulating section 107 modulates the DL data received from retransmission control section 106 and outputs the modulated DL data to signal assignment section 108.

Signal assignment section 108 maps the DL assignment received from control-signal modulating section 104 and the DL data received from data modulation section 107 to a radio resource indicated by scheduling section 102 (allocation time, frequency, coding resource, and/or the like). Signal assignment section 108 outputs, to transmission section 109, the DL signal to which the signal has been mapped.

Transmission section 109 performs radio frequency (RF) processing such as digital-to-analog (D/A) conversion, up-conversion and/or the like on the signal received from signal assignment section 108 and transmits the radio signal to terminal 200 via antenna 110.

Reception section 111 performs RF processing such as down-conversion or analog-to-digital (A/D) conversion on a response signal waveform of the UL signal received from terminal 200 via antenna 110 and outputs the acquired received signal to signal extraction section 112.

Signal extraction section 112 extracts a radio resource portion where the response signal from terminal 200 is transmitted from the received signal based on the radio resource indicated by scheduling section 102 (allocation time, frequency, coding resource, and/or the like) and outputs the received response signal to demodulation and decoding section 113.

Demodulation and decoding section 113 performs equalization, demodulation, and decoding on the received response signal received from signal extraction section 112 and outputs the decoded bit sequence to determination section 114.

Determination section 114 determines whether the response signal for the DL data transmitted from terminal 200 indicates ACK or indicates NACK for the DL data based on the bit sequence inputted from demodulation and decoding section 113. Determination section 114 outputs the determination result (ACK or NACK) to retransmission control section 106.

Configuration of Terminal (At DL Self-Contained Operation)

Figure 6:
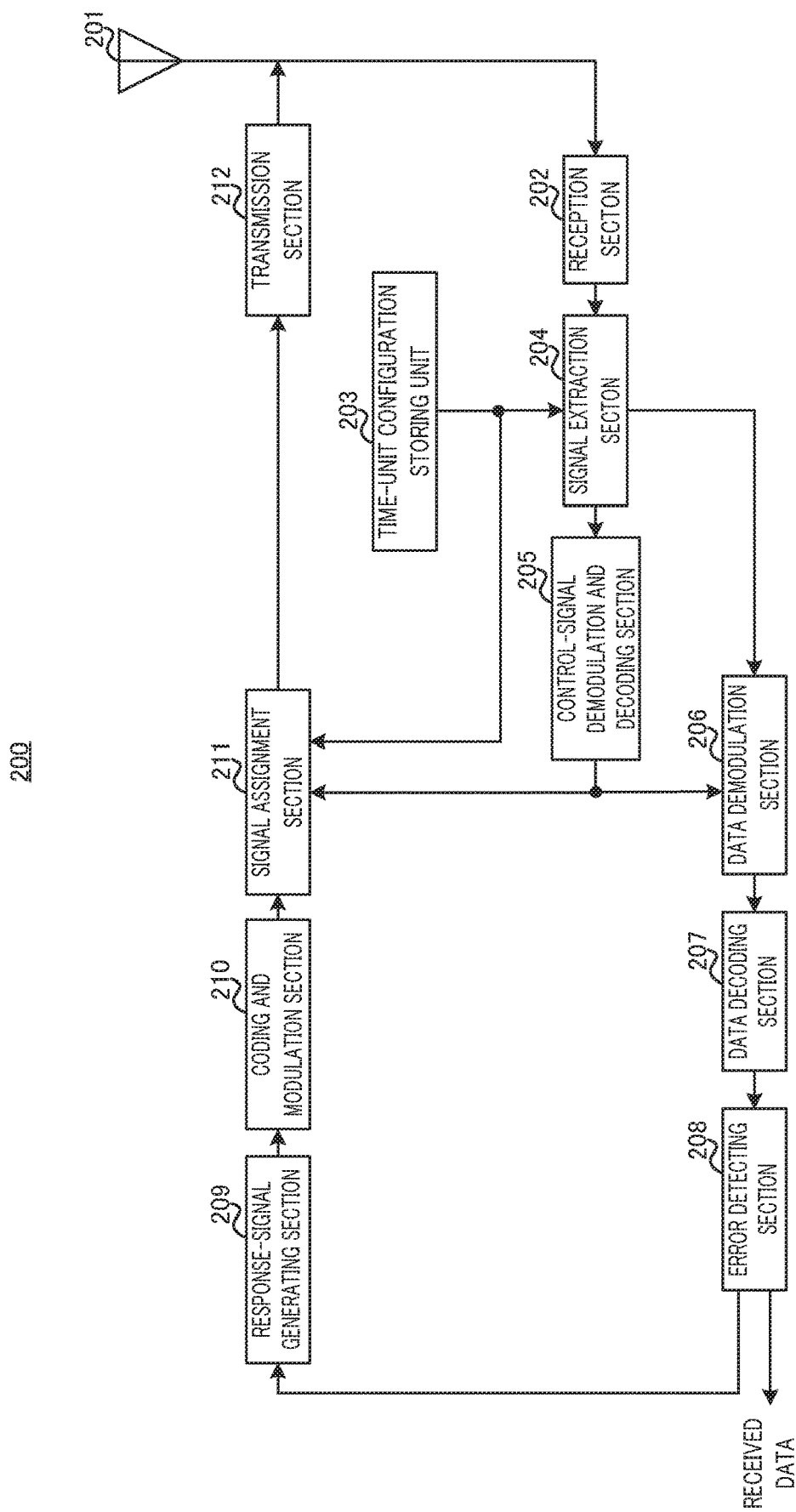
FIG. 6 is a block diagram illustrating a configuration of the terminal at the time of the DL self-contained operation according to Embodiment 1.

FIG. 6 is a block diagram illustrating a configuration of terminal 200 that performs a DL self-contained operation according to Embodiment 1. In FIG. 6, terminal 200 includes antenna 201, reception section 202, time-unit configuration storing unit 203, signal extraction section 204, control-signal demodulating and decoding section 205, data demodulation section 206, data decoding section 207, error detecting section 208, response-signal generating section 209, coding and modulation section 210, signal assignment section 211, and transmission section 212.

Terminal 200 illustrated in FIG. 6 receives DL assignment and DL data transmitted from base station 100 in a DL transmission region in a time unit composed of "DL transmission region," "gap interval," and "UL transmission region" (self-contained time unit). Furthermore, terminal 200 transmits a response signal including an ACK/NACK (UCI may be further included) for the DL data in the UL transmission region in the time unit.

In terminal 200, reception section 202 receives via antenna 201 the DL assignment and DL data transmitted from base station 100 and performs RF processing such as down-conversion or A/D conversion to the received radio signal to acquire a baseband signal. Reception section 202 outputs the baseband signal to signal extraction section 204.

Time-unit configuration storing section 203 previously stores a time-unit configuration including multiple HARQ processes as in time-unit configuration storing section 101 of base station 100. As described above, the number of HARQ processes to be applied within a single time unit may be determined by base station 100 and previously indicated to terminal 200. Alternatively, the number of HARQ processes may be a fixed value previously defined by the system. Time-unit configuration storing section 203 outputs the time-unit configuration in accordance with the number of HARQ processes to be applied to signal extraction section 204 and signal assignment section 211.

Signal extraction section 204 extracts the DL assignment and DL data for each HARQ process from the baseband signal received from reception section 202, based the time-unit configuration outputted from time-unit configuration storing section 203 and outputs the DL assignment to control-signal demodulating and decoding section 205 while outputting the DL data to data demodulation section 206.

Control-signal demodulating and decoding section 205 performs blind-decoding on the DL assignment received from signal extraction section 204 to attempt decoding of the DL assignment intended for terminal 200. When determining that the DL assignment is intended for terminal 200 as a result of blind-decoding, control-signal demodulating and decoding section 205 outputs scheduling information (e.g., DL-data allocation resource information or response-signal allocation frequency and coding resource and/or the like) included in the DL assignment to data demodulation section 206 and signal assignment section 211.

Data demodulation section 206 demodulates the DL data received from signal extraction section 204, based on the DL-data allocation resource information received from control-signal decoding section 205.

Data decoding section 207 decodes the DL data received from data demodulation section 206 and outputs the decoded DL data to error detecting section 208.

Error detecting section 208 performs, for example, CRC error detection on the DL data received from data decoding section 207 and outputs an error detection result (ACK/NACK) to response-signal generating section 209. Error detecting section 208 outputs, as the received data, the DL data that has been determined to have no error as a result of error detection.

Response-signal generating section 209 generates a response signal (bit sequence) for the received DL data using the error detection result (ACK or NACK) received from error detecting section 208 and outputs the response signal to coding and modulation section 210.

Coding and modulation section 210 performs error correction coding on the response signal (bit sequence) received from response-signal generating section 209, modulates the coded bit sequence, and outputs the modulated symbol sequence to signal assignment section 211.

Signal assignment section 211 maps the signal received from coding and modulation section 210 to an allocation time resource in accordance with the HARQ process number indicated by time-unit configuration storing section 203. In addition, signal assignment section 211 maps the response signal to the allocation frequency and coding resource included in the scheduling information indicated by control-signal demodulating and decoding section 205.

Transmission section 212 performs RF processing such as D/A conversion and/or up-conversion or the like on the signal received from signal assignment section 211 and transmits a radio signal to base station 100 via antenna 201.

Configuration of Base Station (At UL Self-Contained Operation)

Figure 7:
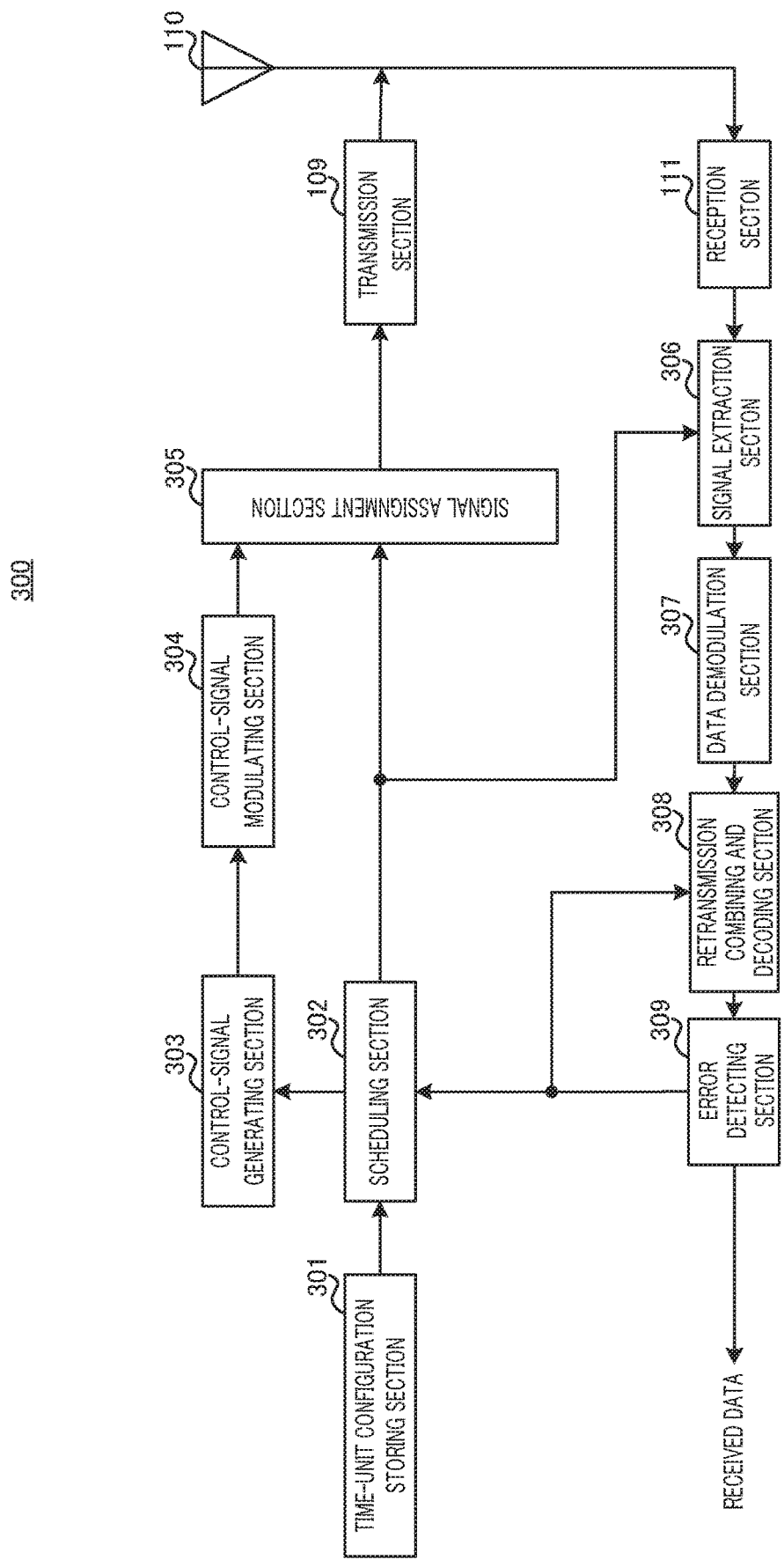
FIG. 7 is a block diagram illustrating a configuration of the base station at the time of a UL self-contained operation according to Embodiment 1.

FIG. 7 is a block diagram illustrating a configuration of base station 300 that performs a UL self-contained operation according to Embodiment 1. In FIG. 7, base station 300 includes time-unit configuration storing section 301, scheduling section 302, control-signal generating section 303, control-signal modulating section 304, signal assignment section 305, transmission section 109, antenna 110, reception section 111, signal extraction section 306, data demodulation section 307, retransmission combining and decoding section 308, and error detecting section 309.

Base station 300 illustrated in FIG. 7 transmits UL assignment in a DL transmission region in a time unit composed of "DL transmission region," "gap interval," and "UL transmission region" (self-contained time unit). Furthermore, base station 300 receives the UL data (UCI may be further included) transmitted from terminal 400 in the UL transmission region in the time unit.

In base station 300, time-unit configuration storing section 301 previously stores a time-unit configuration including multiple HARQ processes. In case of a UL self-contained time unit, time-unit configuration storing section 301 stores signal mapping in the regions including a DL transmission region (including UL assignment), a gap interval (Gap) and a UL transmission region (including UL data) for each HARQ process number (HARQ process). Time-unit configuration storing section 301 outputs the time-unit configuration stored therein to scheduling section 302. Note that, a detailed description will be hereinafter given of the time-unit configuration including multiple HARQ processes stored in time-unit configuration storing section 301.

When an error detection result indicating an error for the last UL data is inputted from error detecting section 309, scheduling section 302 performs scheduling for UL data retransmission using the HARQ process number during the last transmission of terminal 400. Meanwhile, when an error detection result indicating no error for the last UL data is inputted from error detecting section 309, scheduling section 302 performs scheduling for a new packet to an optional HARQ process number for terminal 400.

Scheduling section 302 determines, for terminal 400, scheduling information about UL assignment and UL data in a UL self-contained time unit (e.g., ID of allocation terminal, allocation resource information (frequency, time, coding resource and/or the like) to terminal 400, modulation and coding scheme of UL data, response-signal allocation resource information, and/or retransmission control information (New data Indicator, Redundancy Version and/or the like)).

Scheduling section 302 determines time resource allocation in the time unit based on the signal mapping of UL assignment, Gap and UL data for each HARQ process number in the time unit outputted from time-unit configuration storing section 301.

The number of HARQ processes to be applied within a single time unit is determined by scheduling section 302 in accordance with a method similar to that of base station 100 (scheduling section 102).

Note that, as in base station 100, the signal mapping of each HARQ process number in the time unit is fixed, so that terminal 400 (reception side) can uniquely know the HARQ process number from the signal mapping in the time unit when synchronization of the time unit is successful. Thus, base station 300 does not have to indicate the HARQ process number to terminal 400 by including the number in UL assignment.

Scheduling section 302 outputs scheduling information to control-signal generating section 303, signal assignment section 305 and signal extraction section 306.

Control-signal generating section 303 generates a control signal (UL assignment) intended for terminal 400. UL assignment includes a cell-specific higher-layer signal, a group or RAT-specific higher-layer signal, a terminal-specific higher-layer signal, UL-data allocation resource information, retransmission control information and/or the like. Control-signal generating section 303 generates a control information bit sequence using these pieces of control information, encodes the generated control information bit sequence, and outputs the encoded control signal to control-signal modulating section 304.

Control-signal modulating section 304 modulates the UL assignment received from control-signal generating section 303 and outputs the modulated UL assignment to signal assignment section 305.

Signal assignment section 305 maps the UL assignment received from control-signal modulating section 304 to a radio resource (allocation time, frequency, coding resource and/or the like) for each HARQ process number, which is indicated by scheduling section 302. Signal assignment section 305 outputs, to transmission section 109, the DL signal to which the signal is mapped.

Transmission section 109, antenna 110, and reception section 111 are configured to operate in a way similar to those included in base station 100.

Signal extraction section 306 extracts a radio resource portion where the UL data from terminal 400 is transmitted from the received signal based on the radio resource (allocation time, frequency, coding resource, and/or the like) indicated by scheduling section 302, and outputs the received UL data to data demodulation section 307.

Data demodulation section 307 performs equalization and demodulation processing on the UL data received from signal extraction section 306 and outputs the demodulated UL data to retransmission combining and decoding section 308.

When holding the UL data of the decoding target HARQ process number of terminal 400 (when the UL data is retransmission data), retransmission combining and decoding section 308 combines together the held UL data and the UL data outputted from data demodulation section 307 in accordance with a predetermined HARQ combining method such as chase combining (CC) or incremental redundancy (IR) and performs decoding processing on the combined UL data. When not holding the UL data of the HARQ process number of terminal 400 (when the UL data is the initial packet), retransmission combining and decoding section 308 performs decoding processing without performing UL data combining processing first. Retransmission combining and decoding section 308 then outputs the decoded UL data to error detecting section 309. Moreover, when the detection result from error detecting section 309 indicates no error, retransmission combining and decoding section 308 deletes the UL data of the HARQ process number held by terminal 400.

Error detecting section 309 performs, for example, CRC error detection on the UL data received from retransmission combining and decoding section 308, and outputs the error detection result (ACK or NACK) to scheduling section 302 and retransmission combining and decoding section 308.

Error detecting section 309 outputs, as the received data, the UL data that has been determined to have no error as a result of error detection.

Configuration of Terminal (At UL Self-Contained Operation)

Figure 8:
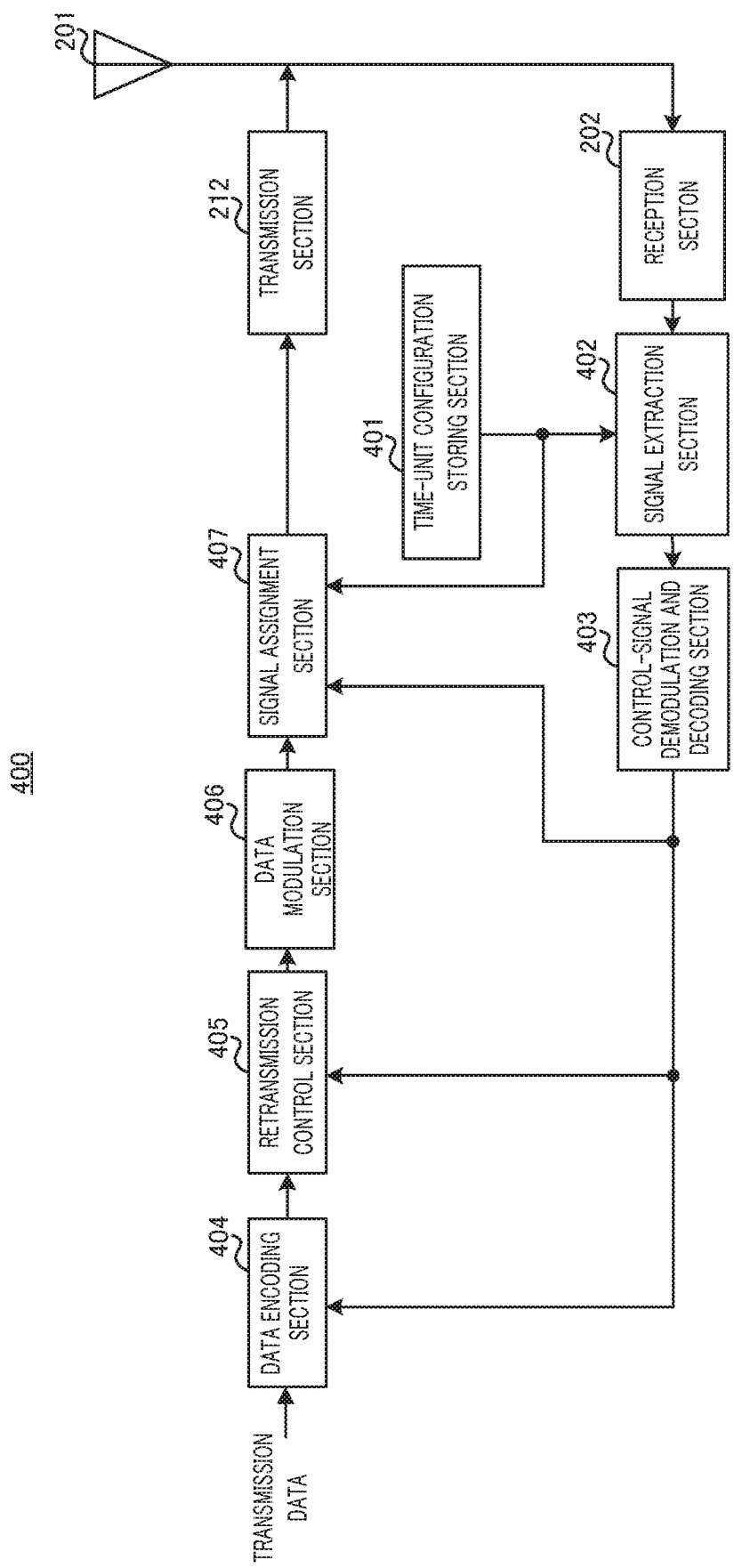
FIG. 8 is a block diagram illustrating a configuration of the terminal at the time of the UL self-contained operation according to Embodiment 1.

FIG. 8 is a block diagram illustrating a configuration of terminal 400 that performs a UL self-contained operation according to Embodiment 1. In FIG. 8, terminal 400 includes antenna 201, reception section 202, time-unit configuration storing unit 401, signal extraction section 402, control-signal demodulating and decoding section 403, data encoding section 404, retransmission control section 405, data modulation section 406, signal assignment section 407, and transmission section 212.

Terminal 400 illustrated in FIG. 8 receives the UL assignment transmitted from base station 300 in a DL transmission region in a time unit composed of "DL transmission region," "gap interval," and "UL transmission region" (self-contained time unit). Furthermore, terminal 400 transmits UL data (UCI may be further included) in the UL transmission region in the time unit.

Antenna 201 and reception section 202 in terminal 400 are configured to operate in a way similar to those included in terminal 200.

Time-unit configuration storing section 401 previously stores a time-unit configuration including multiple HARQ processes as in time-unit configuration storing section 301 of base station 300. As described above, the number of HARQ processes to be applied within a single time unit may be determined by base station 300 and previously indicated to terminal 400. Alternatively, the number of HARQ processes may be a fixed value previously defined by the system. Time-unit configuration storing section 401 outputs the time-unit configuration in accordance with the number of HARQ processes to be applied to signal extraction section 402 and signal assignment section 407.

Signal extraction section 402 extracts UL assignment for each HARQ process from the baseband signal received from reception section 202 based the time-unit configuration outputted from time-unit configuration storing section 401, and outputs the UL assignment to control-signal demodulating and decoding section 403.

Control-signal demodulating and decoding section 403 performs blind-decoding on the UL assignment received from signal extraction section 402 to attempt decoding of the UL assignment intended for terminal 400. When determining that the UL assignment is intended for terminal 400 as a result of blind-decoding, control-signal demodulating and decoding section 403 outputs scheduling information included in the UL assignment to data encoding section 404, retransmission control section 405, and signal assignment section 407.

Data encoding section 404 performs error correction coding on the UL data (transmission data) in accordance with the coding scheme included in the UL assignment received from control-signal demodulating and decoding section 403, and outputs the encoded UL data to retransmission control section 405.

Retransmission control section 405 determines whether the UL data is the initial packet or retransmission packet based on the new data indicator included in the UL assignment received from control-signal demodulating and decoding section 403. In case of the initial packet, retransmission control section 405 holds the encoded UL data received from data encoding section 404, and also outputs the encoded UL data to data modulation section 406. In case of the initial packet, retransmission control section 405 determines that transmission and reception of the last transmission packet has succeeded, and discards the held data of the corresponding HARQ process number. Meanwhile, in case of a retransmission packet, retransmission control section 405 extracts the transmission data indicated by retransmission control information (redundancy version) included in the UL assignment from the held data of the corresponding HARQ process number, and outputs the transmission data to data modulation section 406.

Data modulation section 406 modulates the UL data received from retransmission control section 405 and outputs the modulated UL data to signal assignment section 407.

Signal assignment section 407 maps the UL data received from data modulation section 406 to the radio resource (frequency and coding resource) included in the UL assignment received from control-signal demodulating and decoding section 403. Furthermore, signal assignment section 407 maps the UL data to the allocation time resource in accordance with the HARQ process number indicated by time-unit configuration storing section 401. Signal assignment section 407 outputs, to transmission section 212, the UL signal to which the signal is mapped.

Transmission section 212 operates in a way similar to transmission section 212 included in terminal 200.

Operations of Base Stations 100 and 300, and Terminals 200 and 400

The operations of base stations 100 and 300, and terminals 200 and 400 each configured in the manner described above will be described in detail.

The time-unit configurations stored in time-unit configuration storing sections 101, 203, 301, and 401 have common features in that they include, within a single time unit, a set of signals including "DL assignment, DL data, and ACK (response signal for the DL data)" or "UL assignment and UL data" corresponding to each of the multiple HARQ process numbers in a single time unit composed of "DL transmission region," "gap interval," and "UL transmission region" (self-contained time unit).

More specifically, in Embodiment 1, each time unit includes a DL transmission region and a UL transmission region for each of the multiple HARQ processes. Stated differently, in a DL self-contained time unit, multiple sets of signals, each of which sets includes "DL assignment, DL data, and ACK (response signal for the DL data)" corresponding to a certain HARQ process, are included in a single time unit. Meanwhile, in a UL self-contained time unit, multiple sets of signals, each of which sets includes "UL assignment and UL data" corresponding to a certain HARQ process, are included in a single time unit.

In the time unit, signal mapping of the signals ("DL assignment, DL data, and ACK (response signal for the DL data)" or "UL assignment and UL data") is fixed. More specifically, the mapping position of a DL transmission region and the mapping position of a UL transmission region for each of the multiple HARQ processes are fixed within a time unit. Stated differently, the retransmission timings of data (DL data and UL data) are fixed in accordance with the HARQ process numbers in a time unit.

Meanwhile, data (DL data and UL data) can be retransmitted in an optional time unit. More specifically, in Embodiment 1, while the transmission timings for data (DL data and UL data) are fixed in accordance with HARQ processes (HARQ process numbers) within a time unit, the transmission timings (including retransmission timings) between time units are not fixed.

The term "time unit" herein refers to a time unit defined as a unit for signal mapping (transmission timings) of "DL assignment, DL data, and ACK (response signal for the DL data)" or "UL assignment and UL data" for each HARQ process number. Alternatively, the term "time unit" may be defined as one subframe (1 ms) of LTE. Alternatively, the term "time unit" may be defined as a time unit in which the subcarrier interval is 15 kHz and which includes 14 symbols (predetermined fixed number). Alternatively, the "time unit" may be defined as a time unit including 14 symbols (predetermined fixed number) regardless of the subcarrier interval.

Hereinafter, a detailed description will be given of features of time-unit configurations 1 to 3 stored in time-unit configuration storing sections 101, 203, 301, and 401 in base stations 100 and 300, and terminals 200 and 400.

Figure 9A:
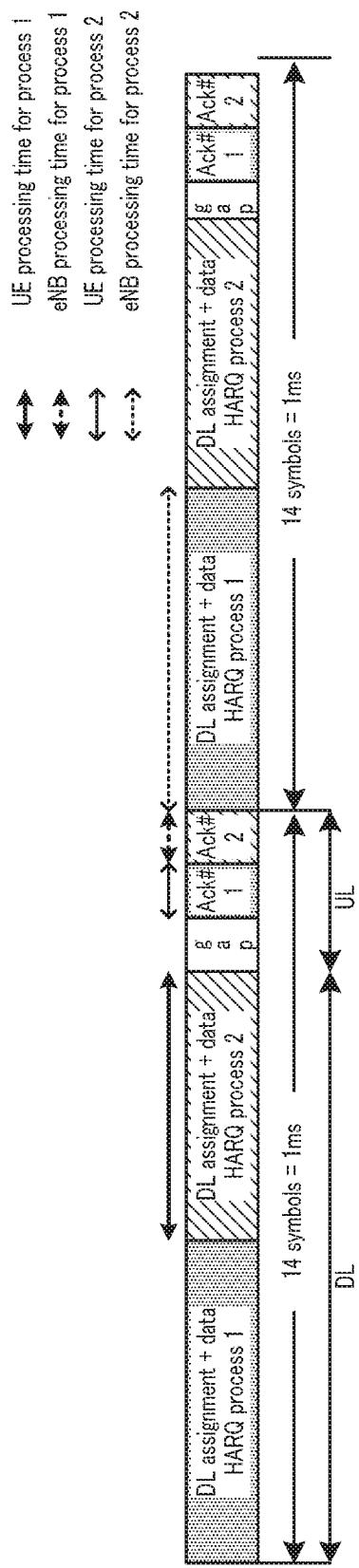
FIG. 9A is a diagram illustrating time-unit configuration 1 at the time of the DL self-contained operation according to Embodiment 1.
Figure 9B:
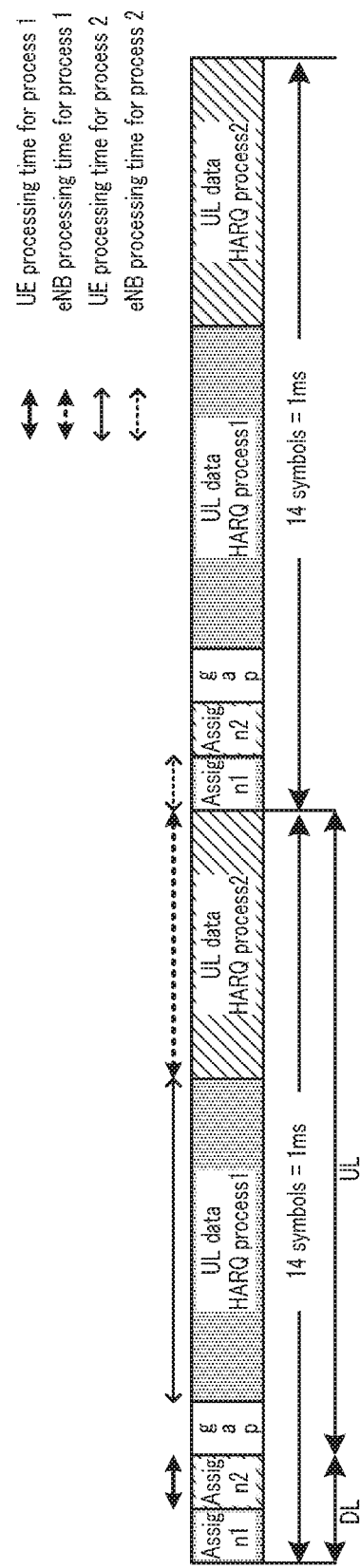
FIG. 9B is a diagram illustrating time-unit configuration 1 at the time of the UL self-contained operation according to Embodiment 1.

Time-Unit Configuration 1 (FIGS. 9A and 9B)

Time-unit configuration 1 defines only one switching point (gap interval) from a "DL transmission region" to a "UL transmission region" within a time unit. For example, the gap length of the gap interval is configured taking into consideration propagation delay between base stations 100 and 300, and terminals 200 and 400.

FIGS. 9A and 9B illustrate a time-unit configuration example in which the number of HARQ processes is two. FIG. 9A illustrates a time-unit configuration example at the time of a DL self-contained operation while FIG. 9B illustrates a time-unit configuration example at the time of a UL self-contained operation.

As illustrated in FIG. 9A, in case of a DL self-contained time unit, the response signal (called ACK #2) for HARQ process number 2 (process 2) is mapped to the end of the time unit. More specifically, in FIG. 9A, the UL transmission region (response signal) of one of the HARQ process numbers is mapped to the end of the time unit instead of the gap interval (gap) mapped for securing the processing time of the eNB as in FIG. 1A.

Accordingly, decoding processing of the response signal (ACK #1) for HARQ process number 1 (process 1) in the eNB (base station 100) and the scheduling processing of the next time unit become executable in the transmission time of ACK #2, which is the UL transmission region of HARQ process number 2 (process 2). Thus, the gap interval at the end of the time unit as in FIG. 1A is eliminated, and the DL data can be retransmitted in the next time unit in FIG. 9A.

As in FIG. 9B, in case of a UL self-contained time unit, the UL data (called UL data #2) of HARQ process number 2 (process 2) is mapped to the end of the time unit. Stated differently, in FIG. 9B, the UL transmission region (UL data) of one of the HARQ process numbers is mapped to the end of the time unit instead of the gap interval (gap) mapped for securing the processing time of the eNB as in FIG. 1B.

Accordingly, decoding processing of the UL data (UL data #1) for HARQ process number 1 (process 1) in the eNB (base station 300) and the scheduling processing of the next time unit become executable in the transmission time of UL data #2, which is the UL transmission region of HARQ process number 2 (process 2). Thus, the gap interval at the end of the time unit as in FIG. 1B is eliminated and the UL data can be retransmitted in the next time unit in FIG. 9B.

As described above, terminals 200 and 400 using one of multiple HARQ processes in a time unit use a transmission region corresponding to the other HARQ process mapped between the DL transmission region and UL transmission region corresponding to this HARQ process as the processing time for the HARQ process.

Figure 10A:
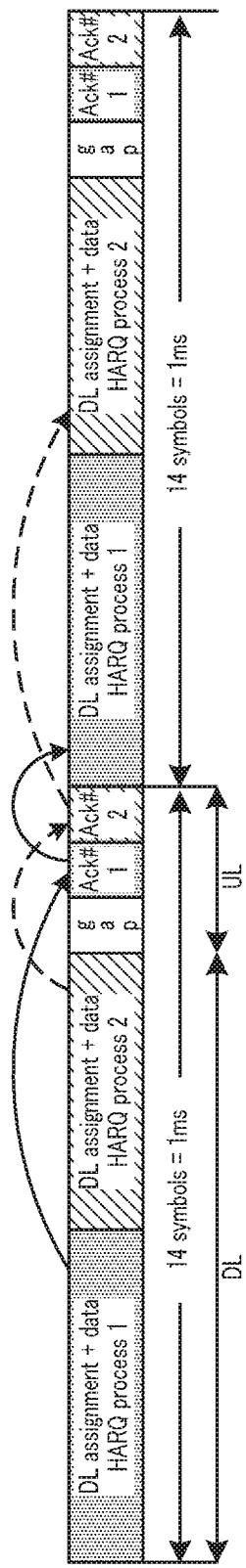
FIG. 10A is a diagram illustrating an HARQ operation example at the time of the DL self-contained operation according to Embodiment 1.
Figure 10B:
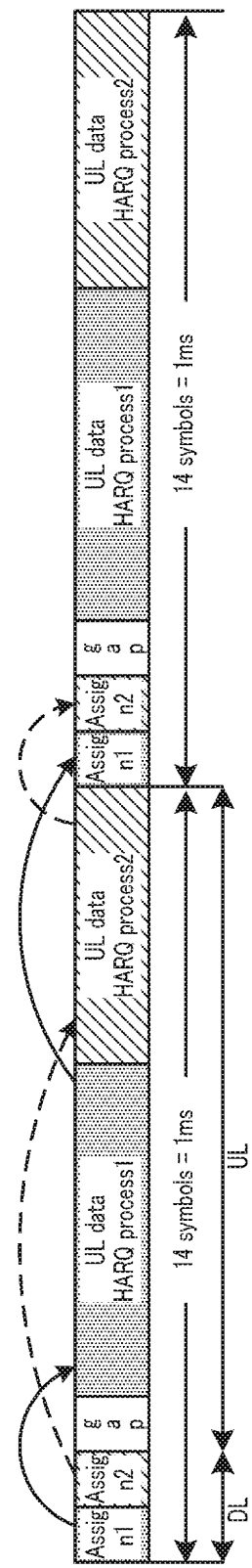
FIG. 10B is a diagram illustrating an HARQ operation example at the time of the UL self-contained operation according to Embodiment 1.

FIGS. 10A and 10B illustrate a correspondence relationship between the signals of the HARQ processes in time-unit configuration 1 (FIGS. 9A and 9B). In FIGS. 10A and 10B, solid arrows indicate a correspondence relationship between the signals of HARQ process number 1 while broken arrows indicate a correspondence relationship between the signals of HARQ process number 2.

For example, in FIG. 10A, when ACK #1 for DL data #1 of HARQ process number 1 in a certain time unit ("signal transmitted in DL assignment+data HARQ process 1" of FIG. 10A) is NACK, base station 100 performs scheduling for retransmission of the DL data in DL assignment #1 (signal transmitted in "DL assignment+data HARQ process 1" of FIG. 10A) in the next time unit. The same applies to the signal of HARQ process number 2.

Moreover, for example, in FIG. 10B, when the decoding result of UL data #2 of HARQ process number 2 in a certain time unit (signal transmitted in "UL data HARQ process 2" of FIG. 10B) is NACK, base station 300 performs scheduling for retransmission of UL data #2 in UL assignment #2 (signal transmitted in "Assignment 2" of FIG. 10B) in the next time unit. The same applies to the signal of HARQ process number 1.

The average latency of the time-unit configuration illustrated in FIGS. 9A and 9B is estimated as follows.

Note that, FIG. 9A (DL self-contained time unit) assumes a time-unit configuration having the symbol length of each signal of the DL self-contained time unit illustrated in FIG. 2A. Meanwhile, FIG. 9B (UL self-contained time unit) assumes a time-unit configuration having the symbol length of each signal of UL self-contained time unit illustrated in FIG. 2B.

In FIG. 9A, the average latency from generation of the transmission buffer of base station 100 until reception of a response signal for the DL data by base station 100 from terminal 200 ((average value of average latency of HARQ process numbers 1 and 2) is 14.4 symbols ((8/2+13)*(8/14)+(6/2+8)*(6/14)). Accordingly, in FIG. 9A, the average latency is reduced as compared with the average latency (20 symbols) of the time unit illustrated in FIG. 1A.

In FIG. 9B, the average latency from generation of the transmission buffer of terminal 400 until completion of transmission of the initial UL data by terminal 400 ((average value of average latency of HARQ process numbers 1 and 2) is 28.3 symbols ((8/2+14+9)*(8/14)+(6/2+14+13)*(6/14)). Accordingly, in FIG. 9B, the average latency is reduced as compared with the average latency (34 symbols) of the time unit illustrated in FIG. 1B.

In addition, in the assumption illustrated in FIGS. 2A and 2B, the overhead for gap intervals of the time-unit configuration is 1/14=7% in both FIGS. 9A and 9B. Accordingly, in the time-unit configuration of FIGS. 9A and 9B, the overhead for gap intervals is reduced as compared with the time-unit configuration of FIGS. 1A and 1B.

In the DL self-contained operation, as illustrated in FIG. 9A, the processing times of terminal 200 allowed in the time-unit configuration with the assumption illustrated in FIGS. 2A and 2B are five symbols and one symbol for HARQ process numbers 1 and 2, respectively. Accordingly, in FIG. 9A, the processing time of terminal 200 for HARQ process number 1 can be extended as compared with the processing time (one symbol) of the terminal in FIG. 1A.

In addition, as illustrated in FIG. 9A, the processing times of base station 100 allowed in the time-unit configuration with the assumption illustrated in FIGS. 2A and 2B are one symbol and six symbols for HARQ process numbers 1 and 2, respectively. Accordingly, in FIG. 9A, the processing time of base station 100 for HARQ process number 2 can be extended as compared with the processing time (one symbol) of the base station in FIG. 1A.

Likewise, in the UL self-contained operation, as illustrated in FIG. 9B, the processing times of terminal 400 allowed in the time-unit configuration with the assumption illustrated in FIGS. 2A and 2B are one symbol and six symbols for HARQ process numbers 1 and 2, respectively. Accordingly, in FIG. 9B, the processing time of terminal 400 for HARQ process number 2 can be extended as compared with the processing time (one symbol) of the terminal in FIG. 1B.

In addition, as illustrated in FIG. 9B, the processing times of base station 300 allowed in the time-unit configuration based on the assumption illustrated in FIGS. 2A and 2B are five symbols and one symbol for HARQ process numbers 1 and 2, respectively. Accordingly, in FIG. 9B, the processing time of base station 300 for HARQ process number 1 can be extended as compared with the processing time (one symbol) of the base station in FIG. 1B.

As described above, in time-unit configuration 1 (FIGS. 9A and 9B), each time unit is configured to include multiple sets of signals, each of which sets includes "DL assignment, DL data, and response signal (response signal for the DL data)" or "UL assignment and UL data" for the same HARQ process number. Moreover, in time-unit configuration 1, only a single switching point (gap interval) from "DL transmission region" to "UL transmission region" is defined within each time unit in time-unit configuration 1. Furthermore, in time-unit configuration 1, a UL transmission region is mapped to the end of the time unit, and no gap interval is mapped.

Accordingly, in time-unit configuration 1, as compared with the time units illustrated in FIGS. 1A and 1B, the overhead for gap intervals can be reduced, and the average latency can be shortened. Moreover, according to time-unit configuration 1, the effect of extending the processing times allowed for base stations 100 and 300, and terminals 200 and 400 can be obtained. In addition, according to time-unit configuration 1, a data signal transmitted in a certain time unit can be retransmitted in the next time unit.

Figure 11:
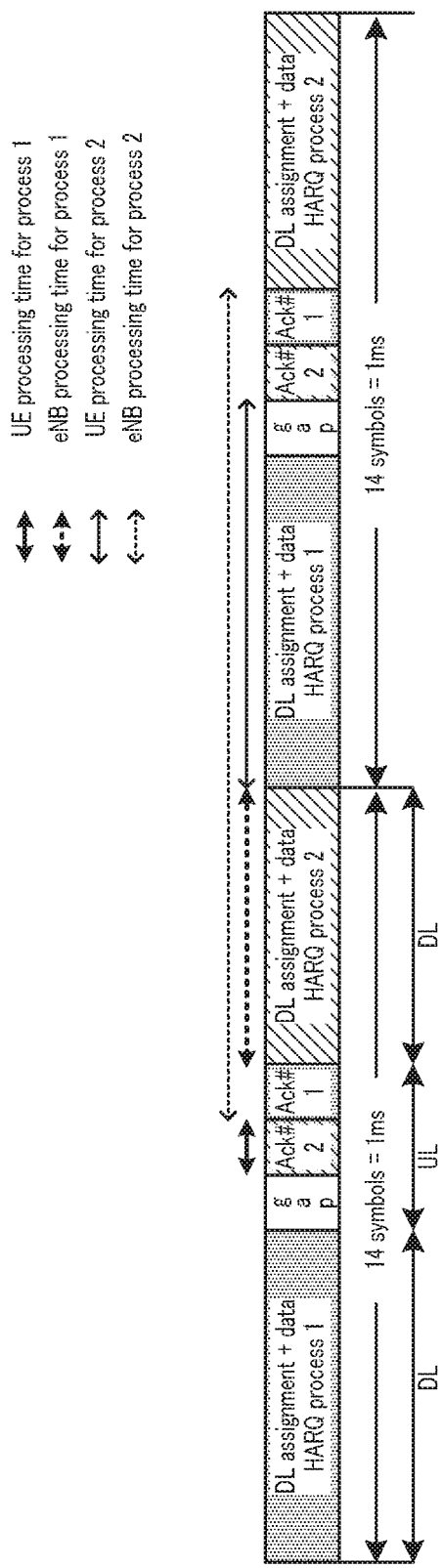
FIG. 11 is a diagram illustrating time-unit configuration 2 at the time of the DL self-contained operation according to Embodiment 1.

Time-Unit Configuration 2 (FIG. 11)

Time-unit configuration 2 defines only a single switching point (gap interval) from the "DL transmission region" to the "UL transmission region" within a time unit as in time-unit configuration 1 (FIG. 9A).

Moreover, in time-unit configuration 2, a UL transmission region corresponding to at least one HARQ process (HARQ process number) of multiple HARQ processes is mapped at a timing earlier than a DL transmission region corresponding to the HARQ process within the time unit (DL self-contained time unit) at the time of a DL self-contained operation. Stated differently, time-unit configuration 2 is characterized in that a response signal is transmitted before DL assignment and DL data in a time unit.

FIG. 11 illustrates a time-unit configuration example at the time of a DL self-contained operation when the number of HARQ processes is two.

As illustrated in FIG. 11, in case of a DL self-contained time unit, a UL transmission region of HARQ process number 2 (response signal (ACK #2)) is mapped at a timing earlier than the DL transmission region of HARQ process number 2 (DL assignment+data HARQ process 2 (DL assignment #2, DL data #2)) in each time unit.

Accordingly, the decoding processing of DL assignment #2 and DL data #2 of HARQ process number 2 by terminal 200 becomes executable in the transmission time (DL assignment+data HARQ process 1) of DL assignment #1 and DL data #1 in the next time unit. In FIG. 11, sevens symbols are secured for the processing time of terminal 200 for HARQ process number 2. Accordingly, the processing time of terminal 200 for HARQ process number 2 can be extended in FIG. 11 as compared with the processing time (one symbol) of the terminal in FIG. 1A.

As described above, in time-unit configuration 2 (FIG. 11), each time unit is configured to include multiple sets of signals, each of which sets includes "DL assignment, DL data, and response signal (response signal for the DL data)" for the same HARQ process number. Moreover, in each time unit, a response signal (UL transmission region) is mapped at a timing earlier than DL assignment and DL data (DL transmission region) for at least one of the HARQ processes.

Accordingly, in time-unit configuration 2, as compared with the time units illustrated in FIG. 1A, the effect of extending the processing time allowed for terminal 200 can be obtained. In time-unit configuration 2, the overhead for gap intervals can be reduced, and the average latency can be shortened as with time-unit configuration 1. Moreover, according to time-unit configuration 2, a data signal transmitted in a certain time unit can be retransmitted in the next time unit as with time-unit configuration 1.

Figure 12A:
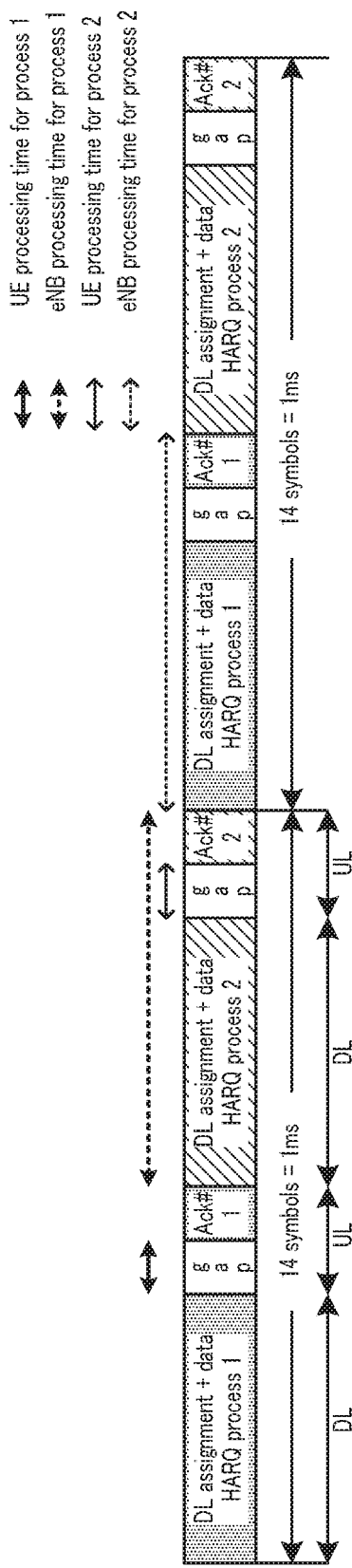
FIG. 12A is a diagram illustrating time-unit configuration 3 at the time of the DL self-contained operation according to Embodiment 1.
Figure 12B:
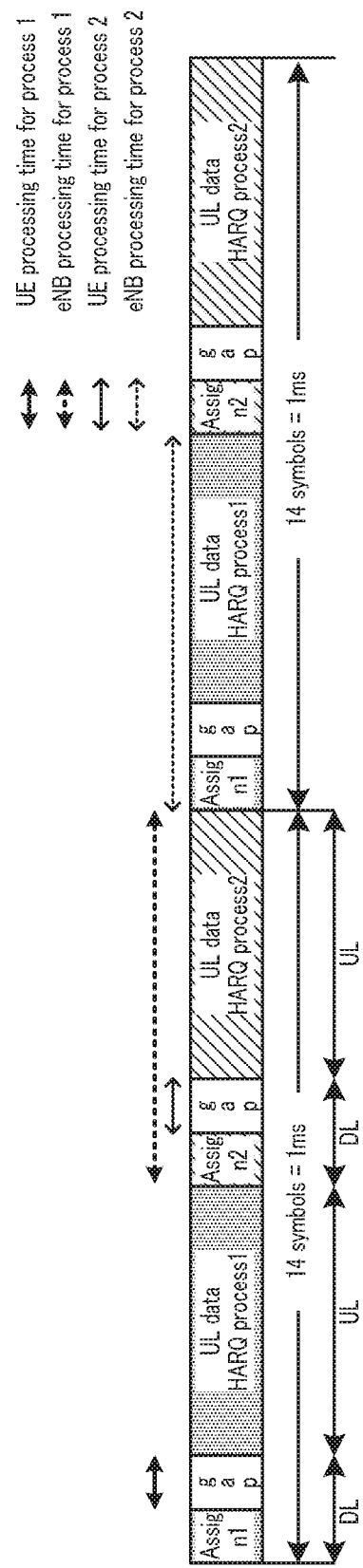
FIG. 12B is a diagram illustrating time-unit configuration 3 at the time of the UL self-contained operation according to Embodiment 1.

Time-Unit Configuration 3 (FIGS. 12A and 12B)

Time-unit configuration 3 is characterized in that the number of switching points (gap intervals) from "DL transmission region" to "UL transmission region" is set equal to the number of HARQ processes used in the time unit.

FIGS. 12A and 12B illustrate a time-unit configuration in which the number of HARQ processes is two. FIG. 12A illustrates a time-unit configuration at the time of a DL self-contained operation while FIG. 12B illustrates a time-unit configuration at the time of a UL self-contained operation.

As illustrated in FIG. 12A, in case of a DL self-contained time unit, the set of signals (DL assignment #1, DL data #1 and ACK #1) of HARQ process number 1 is mapped to the first half of the time unit while the set of signals (DL assignment #2, DL data #2 and ACK #2) of HARQ process number 2 is mapped to the last half of the time unit. Stated differently, the UL transmission region of HARQ process number 2 is mapped to the end of the time unit.

Accordingly, the decoding processing of ACK #1 and the scheduling processing of the next time unit for HARQ process number 1 in the eNB (base station 100) become executable in the transmission time of the set of signals which corresponds to the DL transmission region and UL transmission region of HARQ process number 2. Accordingly, in FIG. 12A, the gap interval at the end of the time unit as illustrated in FIG. 1A (interval for securing the processing time of eNB) is eliminated, and retransmission of DL data #1 in the next time unit becomes possible. The same applies to the signal of HARQ process number 2.

As illustrated in FIG. 12B, in case of a UL self-contained time unit, a set of signals (UL assignment #1 and UL data #1) of HARQ process number 1 is mapped to the first half of the time unit while a set of signals (UL assignment #2 and UL data #2) of HARQ process number 2 is mapped to the last half of the time unit. Stated differently, the UL transmission region of HARQ process number 2 is mapped to the end of the time unit.

Accordingly, the decoding processing of UL data #1 and the scheduling processing of the next time unit for HARQ process number 1 in the eNB (base station 300) become executable in the transmission time of the set of signals which corresponds to the DL transmission region and UL transmission region of HARQ process number 2. Accordingly, in FIG. 12B, the gap interval at the end of the time unit as illustrated in FIG. 1B (interval for securing the processing time of eNB) is eliminated, and retransmission of UL data #1 in the next time unit becomes possible. The same applies to the signal of HARQ process number 2.

As described above, the time units illustrated in FIGS. 12A and 12B each include the number of gap intervals equal to the number of multiple HARQ processes (two). In addition, in each of the time units, the gap interval is mapped between the DL transmission region and UL transmission region of each of the multiple HARQ processes.

The average latency of the time-unit configuration illustrated in FIGS. 12A and 12B is estimated as follows.

Note that, FIG. 12A (DL self-contained time unit) assumes a time-unit configuration having the symbol length of each signal of DL self-contained time unit illustrated in FIG. 2A. Meanwhile, FIG. 12B (UL self-contained time unit) assumes a time-unit configuration having the symbol length of each signal of UL self-contained time unit illustrated in FIG. 2B.

In FIG. 12A, the average latency from generation of the transmission buffer of base station 100 until reception of a response signal for the DL data by base station 100 from terminal 200 for each of HARQ process numbers 1 and 2 is 10.5 symbols (=7/2+7). Accordingly, in FIG. 12A, the average latency is reduced as compared with the average latency (20 symbols) of the time unit illustrated in FIG. 1A.

In FIG. 12B, the average latency from generation of the transmission buffer of terminal 400 until completion of transmission of the initial UL data from terminal 400 is 24.5 symbols (7/2+14+7) for each of HARQ process numbers 1 and 2. Accordingly, in FIG. 12B, the average latency is reduced as compared with the average latency (34 symbols) of the time unit illustrated in FIG. 1B.

In addition, in the assumption illustrated in FIGS. 12A and 12B, the processing times of base station 100 allowed in the time-unit configuration with the assumption illustrated in FIGS. 2A and 2B are seven symbols for both HARQ process numbers 1 and 2. Accordingly, in the time-unit configuration of FIGS. 12A and 12B, the processing times of base stations 100 and 300 for both HARQ process numbers 1 and 2 can be extended as compared with the processing time (one symbol) of the base station in the time-unit configuration of FIGS. 1A and 1B.

In the assumption illustrated in FIGS. 2A and 2B, the overhead for gap intervals in the time-unit configuration illustrated in FIGS. 12A and 12B and the processing times of terminals 200 and 400 are equal to those illustrated in FIGS. 1A and 1B.

As described above, in time-unit configuration 3 (FIGS. 12A and 12B), each time unit is configured to include multiple sets of signals, each of which sets includes "DL assignment, DL data, and response signal (response signal for the DL data)" or "UL assignment and UL data" for the same HARQ process number. In time-unit configuration 3, the UL transmission region is mapped to the end of the time unit while no gap interval is mapped thereto. In addition, in each time unit, the number of switching points (gap intervals) from "DL transmission region" to "UL transmission region" is set equal to the number of HARQ processes applied within the time unit.

Accordingly, the average latency can be shortened in time-unit configuration 3 as compared with the time units illustrated in FIGS. 1A and 1B. Moreover, according to time-unit configuration 3, the effect of extending the processing times allowed for base stations 100 and 300 can be obtained. In addition, according to time-unit configuration 3, a data signal transmitted in a certain time unit can be retransmitted in the next time unit.

Figure 13:
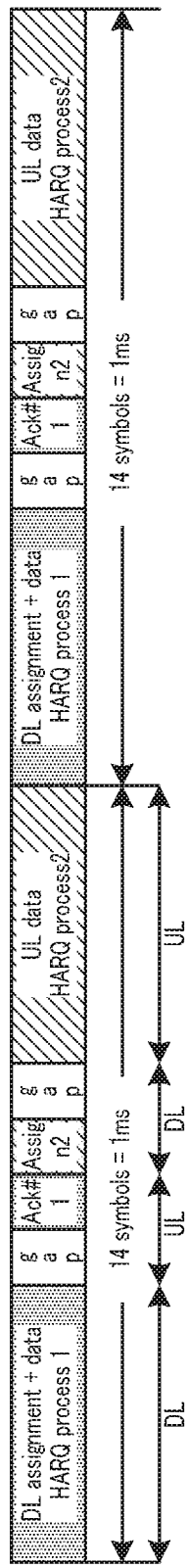
FIG. 13 is a diagram illustrating a variation of time-unit configuration 3 at the time of the UL self-contained operation according to Embodiment 1.

Note that, the switch timings from "UL transmission regions" to "DL transmissions" in the DL self-contained time unit as illustrated in FIG. 12A and in the UL self-contained time unit in FIG. 12B may be set to coincide with each other. Accordingly, as illustrated in FIG. 13, it is made possible to switch between the DL self-contained time unit and UL self-contained time unit with a time interval shorter than that the time unit. In FIG. 13, the DL self-contained time unit is mapped to the first half of each time unit while the UL self-contained time unit is mapped to the last half of each time unit. Thus, it is possible to efficiently allocate radio resources when there is an imbalance between the DL and UL traffic amounts.

Time-unit configurations 1 to 3 have been described thus far.

As described above, in Embodiment 1, each time unit includes a DL transmission region and a UL transmission region for multiple HARQ processes, and a self-contained operation can be performed using a time unit configuration taking into consideration HARQ processes. As described above, the time-unit configuration for self-contained operation taking into consideration HARQ processes makes it possible to suppress an increase in the overhead for gap intervals as well as an increase in average latency, and also to improve the performance such as extension of the processing times allowed for terminals 200 and 400, and base stations 100 and 300.

Embodiment 2

Embodiment 2 is characterized in that an HARQ process (HARQ process number) to be used by a UE is determined from among multiple HARQ processes in a time unit in accordance with the processing capability of the UE.

Configuration of Base Station (At DL Self-Contained Operation)

Base station 100 that performs a DL self-contained operation according to Embodiment 2 is configured in a manner similar to that according to Embodiment 1 (FIG. 5) but is different in operation of scheduling section 102.

More specifically, scheduling section 102 determines scheduling information about DL assignment and DL data in a DL self-contained time unit for terminal 200. Scheduling section 102 determines time resource allocation in a time unit based on mapping (transmission timing) of a set of signals for each HARQ process number in the time unit, which is outputted from time-unit configuration storing unit 101.

Scheduling section 102 determines an HARQ process number (time resource) to be allocated to terminal 200 in a time unit in accordance with the processing capability of terminal 200 at the time of transmission of a new packet. The processing capability of terminal 200 herein may be found from, for example, a user equipment category (UE category) defined by 3GPP, which is to be indicated when base station 100 and terminal 200 are connected to each other. The other operations of scheduling section 102 are similar to those according to Embodiment 1. Note that, a method of allocating an HARQ process number in a time unit by scheduling section 102 in accordance with the processing capability of terminal 200 will be described in detail, hereinafter.

Configuration of Terminal (At DL Self-Contained Operation)

Terminal 200 that performs a DL self-contained operation according to Embodiment 2 is configured in a manner similar to that according to Embodiment 1 (FIG. 5) but is different in operation of signal extraction section 204.

More specifically, signal extraction section 204 extracts the DL assignment and DL data of the HARQ process number in accordance with the processing capability of the terminal from the baseband signal received from reception section 202, based on the time-unit configuration outputted from time-unit configuration storing section 203. The other operations of signal extraction section 204 are similar to extraction section 204 according to Embodiment 1.

The method of determining the HARQ process number (time resource) allocated in accordance with the processing capability of the terminal in signal extraction section 204 is assumed to be similar to the method in base station 100 (scheduling section 102). Note that, the method of determining the HARQ process number may be defined by design and indicated in advance to terminal 200 from base station 100 using a broadcast channel.

Configuration of Base Station (at UL Self-Contained Operation)

Base station 300 that performs a UL self-contained operation according to Embodiment 2 is configured in a manner similar to that according to Embodiment 1 (FIG. 7) but is different in operation of scheduling section 302.

More specifically, scheduling section 302 performs scheduling of a packet of terminal 400 to the HARQ process number in accordance with the processing capability of terminal 400 at the time of transmission of a new packet. The other operations of scheduling section 302 are similar to the scheduling section according to Embodiment 1. Note that, the method of allocating an HARQ process number in a time unit by scheduling section 302 in accordance with the processing capability of terminal 400 will be described in detail, hereinafter.

Configuration of Terminal (At UL Self-Contained Operation)

Terminal 400 that performs a UL self-contained operation according to Embodiment 2 is configured in a manner similar to that according to Embodiment 1 (FIG. 8) but is different in operation of signal extraction section 402.

More specifically, signal extraction section 402 extracts UL assignment of the HARQ process number in accordance with the processing capability of the terminal from the baseband signal received from reception section 202, based on the time-unit configuration outputted from time-unit configuration storing section 401. The other operations of signal extraction section 204 are similar to the signal extraction section according to Embodiment 1.

The method of determining the HARQ process number (time resource) to be allocated in accordance with the processing capability of the terminal in signal extraction section 402 is assumed to be similar to that in base station 300 (scheduling section 302).

Method of Determining HARQ Process Number

Next, a description will be given of a method of determining the HARQ process number in accordance with the processing capability of terminals 200 and 400 in scheduling sections 102 and 302 of base stations 100 and 300.

When a time unit includes multiple sets of signals, each of which sets includes "DL assignment, DL data, and response signal (response signal for the DL data)" or "UL assignment and UL data" for the same HARQ process number, the processing time allowed for the UE may vary depending on the HARQ process number as in time-unit configuration 1 (see FIGS. 9A and 9B) or in time-unit configuration 2 (see FIG. 11) described in Embodiment 1.

In Embodiment 1, with attention to the characteristics mentioned above, scheduling sections 102 and 302 determine the HARQ process numbers only from among HARQ process numbers with a long allowed processing time for terminals 200 and 400 having a low processing capability (e.g., UE categories 1 to 4), as a limitation. Meanwhile, scheduling sections 102 and 302 determine an optional HARQ process number for terminals 200 and 400 having a high processing capability (e.g., other than UE categories 1 to 4).

For example, in case of time-unit configuration 1 (DL self-contained time unit) illustrated in FIG. 9A, scheduling section 102 allocates, as a limitation, only HARQ process number 1, which allows for a delay of five symbols, to terminal 200 with a low processing capability. Stated differently, HARQ process number 2, which allows for only a delay of one symbol, cannot be allocated to terminal 200 with a low processing capability. Meanwhile, scheduling section 102 allocates, to terminal 200 having a high processing capability, one of HARQ process number 1, which allows for a delay of five symbols, and HARQ process number 2, which allows for a delay of one symbol.

Likewise, in case of time-unit configuration 1 (UL self-contained time unit) illustrated in FIG. 9B, scheduling section 302 allocates, as a limitation, only HARQ process number 2, which allows for a delay of six symbols, to terminal 400 with a low processing capability. Stated differently, HARQ process number 1, which allows for only a delay of one symbol, cannot be allocated to terminal 400 with a low processing capability. Meanwhile, scheduling section 302 allocates, to terminal 400 with a high processing capability, one of HARQ process number 1, which allows for a delay of one symbol, and HARQ process number 2, which allows for a delay of six symbols.

Although the description has been given using time-unit configuration 1 (FIGS. 9A and 9B), the same applies to time-unit configuration 2 (FIG. 11).

As described above, in Embodiment 2, HARQ processes having a longer processing time are allocated from among multiple HARQ processes in a time unit to terminals 200 and 400 with a lower processing capability. This operation makes it possible to ease the processing times of terminals 200 and 400 with a low processing capability, so that terminals 200 and 400 with a low processing capability can also perform a self-contained operation and achieve low latency communication. In addition, terminals 200 and 400 with a low processing capability can limit an HARQ process number (time resource) for which a signal is to be received from base stations 100 and 300, so that terminals 200 and 400 can reduce power consumption.

In Embodiment 2, although the method in which an HARQ process number to be applied in accordance with the processing capability of terminals 200 and 400 is limited has been described, the method of determining the HARQ process number is not limited to this. For example, scheduling sections 102 and 302 may limit an HARQ process number to be applied to terminals 200 and 400 in accordance with the decoding processing amount required for DL data. More specifically, scheduling sections 102 and 302 may allocate an HARQ process number allowing for a longer delay for DL data requiring a large decoding processing amount. For example, in case of time-unit configuration 1 illustrated in FIG. 9A, scheduling section 102 allocates, to DL data for which the number of MIMO spatial multiplexing layers is equal to or greater than a predetermined threshold, as a limitation, only HARQ process number 1, which allows for a delay of five symbols. Accordingly, the processing times of terminals 200 and 400 can be eased.

Embodiment 3

Embodiment 3 is characterized in that switching between time-unit configuration 1 (FIGS. 9A and 9B) and time-unit configuration 3 (FIGS. 12A and 12B) described in the above embodiments is performed based on a predetermined rule to select one of the configurations.

Configuration of Base Station (At DL Self-Contained Operation)

Base station 100 that performs a DL self-contained operation according to Embodiment 3 is configured in a manner similar to that according to Embodiment 1 (FIG. 5) but is different in operation of scheduling section 102.

More specifically, scheduling section 102 selects one of time-unit configurations 1 and 3 based on a predetermined rule. Examples of the predetermined rule include the size of a gap length required in a time unit (e.g., whether the gap length is at least the predetermined threshold). The other operations of scheduling section 102 are similar to those according to Embodiment 1. The method of selecting a time-unit configuration in scheduling section 102 will be described in detail, hereinafter.

Configuration of Terminal (At DL Self-Contained Operation)

The configuration of terminal 200 that performs a DL self-contained operation according to Embodiment 3 is configured in a manner similar to that according to Embodiment 1 (FIG. 6) but is different in operation of signal extraction section 204.

More specifically, signal extraction section 204 selects one of time-unit configurations 1 and 3 outputted from time-unit configuration storing section 203, based on an instruction from base station 100. The instruction from base station 100 may be indicated semi-statically using a broadcast channel or may be indicated dynamically (for each time unit) by including the instruction in DL assignment or the like. Signal extraction section 204 extracts DL assignment and DL data for each HARQ process number based on the selected time-unit configuration from the baseband signal received from reception section 202. The other operations of signal extraction section 204 are similar to those in Embodiment 1.

Configuration of Base Station (At UL Self-Contained Operation)

Base station 300 that performs a UL self-contained operation according to Embodiment 3 is configured in a manner similar to that according to Embodiment 1 (FIG. 7) but is different in operation of scheduling section 302.

More specifically, scheduling section 302 selects one of time-unit configurations 1 and 3 based on a predetermined rule (e.g., the size of required gap length). The other operations of scheduling section 302 are similar to those in Embodiment 1. The method of selecting a time-unit configuration in scheduling section 302 will be described in detail, hereinafter.

Configuration of Terminal (At UL Self-Contained Operation)

The configuration of terminal 400 that performs a UL self-contained operation according to Embodiment 3 is configured in a manner similar to that according to Embodiment 1 (FIG. 8) but is different in operation of signal extraction section 402.

More specifically, signal extraction section 402 selects one of time-unit configurations 1 and 3 outputted from time-unit configuration storing section 401, based on an instruction from base station 300. The instruction from base station 300 may be indicated semi-statically using a broadcast channel or may be indicated dynamically (for each time unit) by including the instruction in UL assignment or the like. Signal extraction section 402 extracts UL assignment for each HARQ process number based on the selected time-unit configuration from the baseband signal received from reception section 202. The other operations of signal extraction section 402 are similar to those in Embodiment 1.

Method of Selecting Time-Unit Configuration

Next, a description will be given of a method of selecting a time-unit configuration in scheduling sections 102 and 302 of base stations 100 and 300.

More specifically, scheduling sections 102 and 302 estimate a gap length required per gap interval. Scheduling sections 102 and 302 select time-unit configuration 1 (FIGS. 9A and 9B) when the estimated gap length is equal to or greater than a predetermined threshold and selects time-unit configuration 3 (FIGS. 12A and 12B) when the estimated gap length is less than the threshold.

As described in Embodiment 1, time-unit configuration 1 is advantageous in that the gap overhead is small as compared with time-unit configuration 3. Meanwhile, time-unit configuration 3 is advantageous in that the average latency is small as compared with time-unit configuration 1. Accordingly, in Embodiment 3, switching between time-unit configurations in accordance with the size of the gap length required in a gap interval makes it possible to achieve a reduction in average latency while suppressing an increase in gap overhead.

A description will be given of a case where a predetermined threshold is two symbols, for example.

Figure 14A:
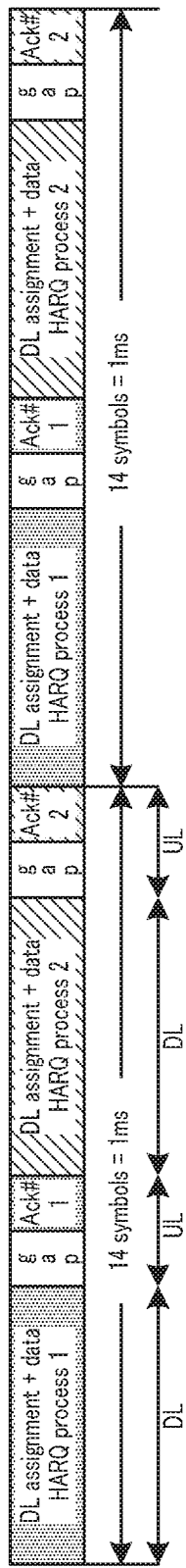
FIG. 14A is a diagram illustrating a selection example of a time-unit configuration according to Embodiment 3.

As illustrated in FIG. 14A, when the gap length required per gap interval is less than two symbols, scheduling section 102 attempts to shorten the average latency by selecting time-unit configuration 3. When the gap length required per gap interval is less than the threshold, use of time-unit configuration 3 makes it possible to reduce the impact on the gap overhead although the number of gap intervals increases.

Figure 14B:
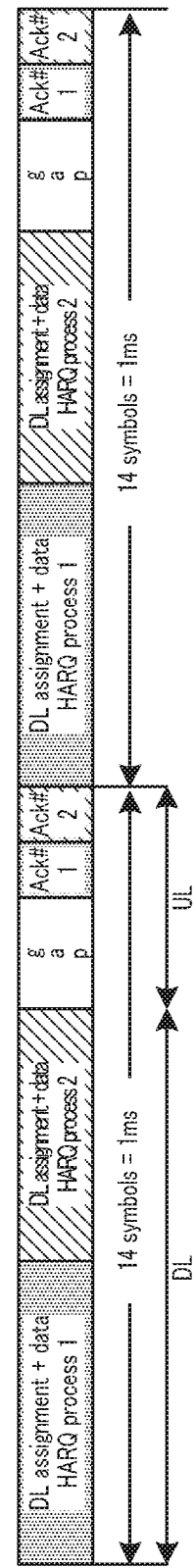
FIG. 14B is a diagram illustrating a selection example of a time-unit configuration according to Embodiment 3.

Meanwhile, as illustrated in FIG. 14B, when the gap length required per gap interval is equal to or greater than two symbols, scheduling sections 102 attempts to suppress an increase in the gap overhead by selecting time-unit configuration 1.

Note that, although the description has been given of a DL self-contained time unit in FIGS. 14A and 14B, the same applies to UL self-contained time unit (e.g., FIGS. 9B and 12B).

Selection of a time-unit configuration may be dynamically controlled (via indication using DL assignment or UL assignment for each time unit). In dynamic control, the amount of indication for control increases but the amount of propagation delay changes for each communication counterpart terminal, and the required gap length thus changes, so that base stations 100 and 300 can select an optimum time-unit configuration for each one of communication-counterpart terminals 200 and 400.

Moreover, selection of a time-unit configuration may be semi-statically controlled (every several hours or several days via indication using a broadcast channel). For example, base stations 100 and 300 may find a required gap length based on the largest latency or the average latency of all terminals under coverage, and switch between time-unit configurations in units of time at which the distribution of terminals 200 and 400 under coverage changes. In semi-static control, the amount of indication for control can be reduced, and base stations 100 and 300 can select a time-unit configuration in accordance with the distribution of terminals 200 and 400 under coverage. Moreover, semi-statically switching between time-unit configurations makes it possible to suppress the variation of inter-cell interference.

As described above, in Embodiment 3, base stations 100 and 300 can perform scheduling for terminals 200 and 400 based on time-unit configuration 1 when the gap length per gap interval is equal to or greater than a predetermined threshold, while performing scheduling for terminals 200 and 400 based on time-unit configuration 3 when the gap length is less than the predetermined threshold. According to the operations described above, base stations 100 and 300 can reduce the average latency while suppressing an increase in gap overhead in accordance with the size of the gap length required per gap interval.

Each embodiment of the present disclosure has been described thus far.

Figures 15A, 15B:
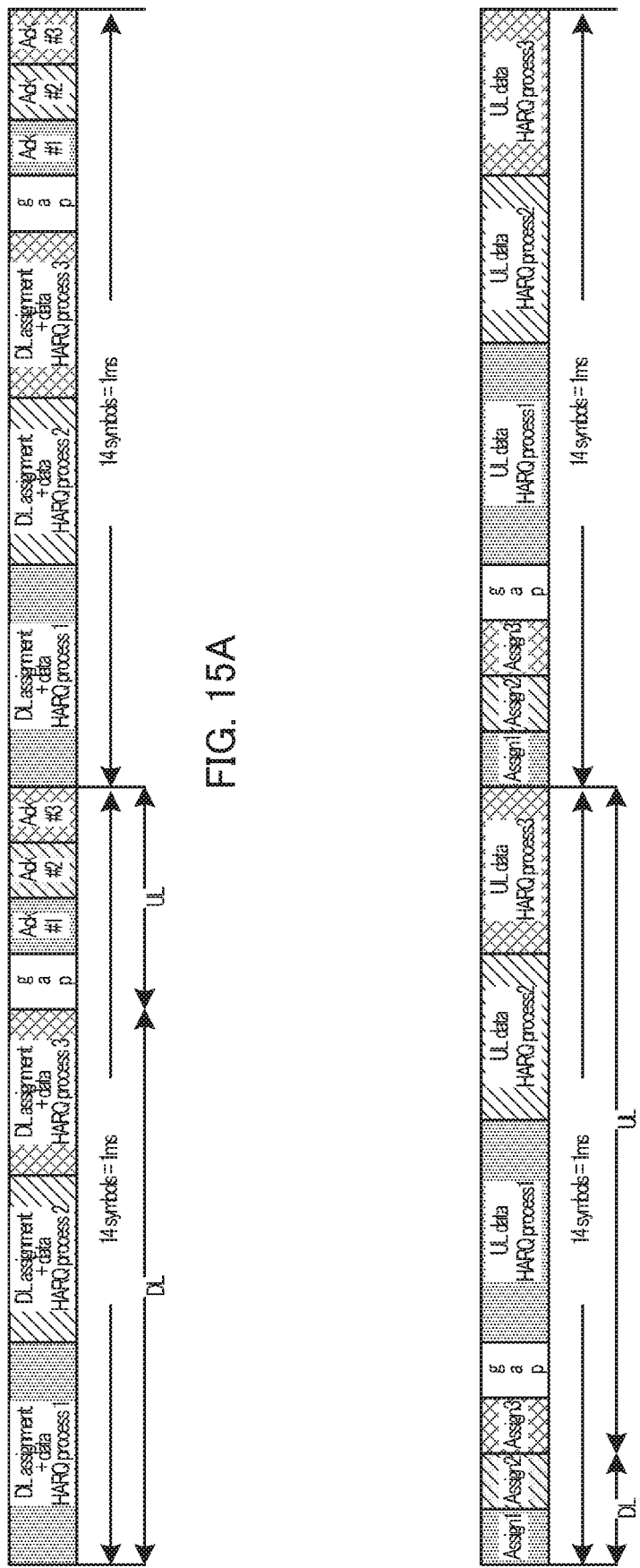
FIG. 15A is a diagram illustrating a time-unit configuration example at the time of a DL self-contained operation according to another embodiment.
FIG. 15B is a diagram illustrating a time-unit configuration example at the time of a UL self-contained operation according to the other embodiment.

OTHER EMBODIMENTS (1) Although the description has been given of the case where the time-unit configurations each include two HARQ processes in a time unit in the above embodiments as an example, the present disclosure may be applied to a case where the number of HARQ processes is three or more, and a similar effect can be obtained in this case as well. FIGS. 15A and 15B illustrate a time-unit configuration example of a case where the number of HARQ processes is equal to three in time-unit configuration 1 of Embodiment 1 (see FIGS. 9A and 9B).

Figure 16A:
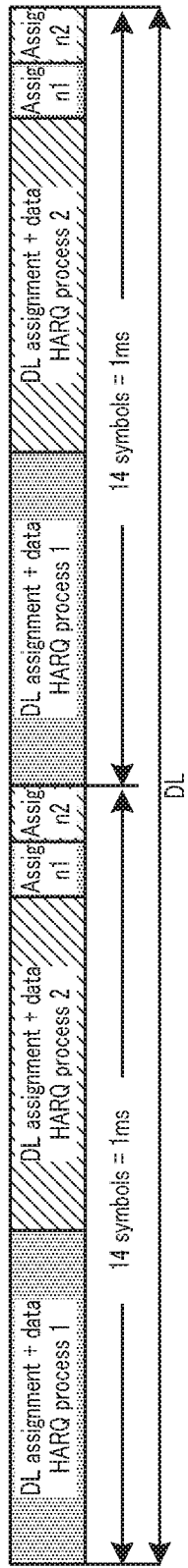
FIG. 16A is a diagram illustrating a time-unit configuration example in an FDD downlink band according to another embodiment.
Figure 16B:
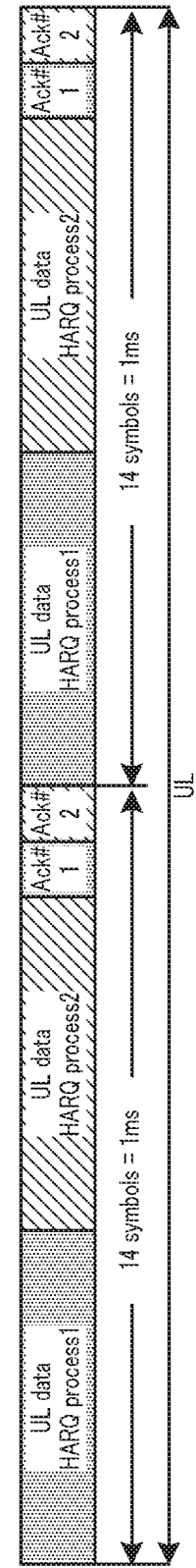
FIG. 16B is a diagram illustrating a time-unit configuration example in an FDD uplink band according to the other embodiment.

(2) Although the description has been given of the time-unit configuration assuming a TDD system, the present disclosure may be applied to an FDD system, and a similar effect can be obtained in this case as well. FIGS. 16A and 16B illustrate a time-unit configuration example of a case where time-unit configuration 1 of Embodiment 1 is applied to an FDD system. FIG. 16A illustrates a frame configuration in an FDD-system DL communication band (FDD DL band), and FIG. 16B illustrates a frame configuration in an FDD-system UL communication band (FDD UL band).

In an FDD system, a gap taking propagation delay into consideration is no longer necessary. More specifically, the FDD-system time-unit configuration in FIGS. 16A and 16B is a time-unit configuration obtained by removing the gaps from the TDD-system time-unit configuration in FIGS. 9A and 9B, and temporarily separating the region into a UL transmission region and a DL transmission region and mapping the UL and DL transmission regions to the FDD-system DL and UL communication bands in each of the DL self-contained time unit and UL self-contained time unit. An effect similar to the effect obtained in the above embodiments can be obtained even when the present disclosure is applied to an FDD system.

(3) In the embodiments described above, a single time unit has been described as a time unit (=1 ms) including 14 symbols (OFDM symbols) where the subcarrier interval is 15 kHz, but a single time unit is not limited to this time unit. For example, a single time unit may be defined as a time unit including 14 symbols regardless of the subcarrier interval.

Figure 17A:
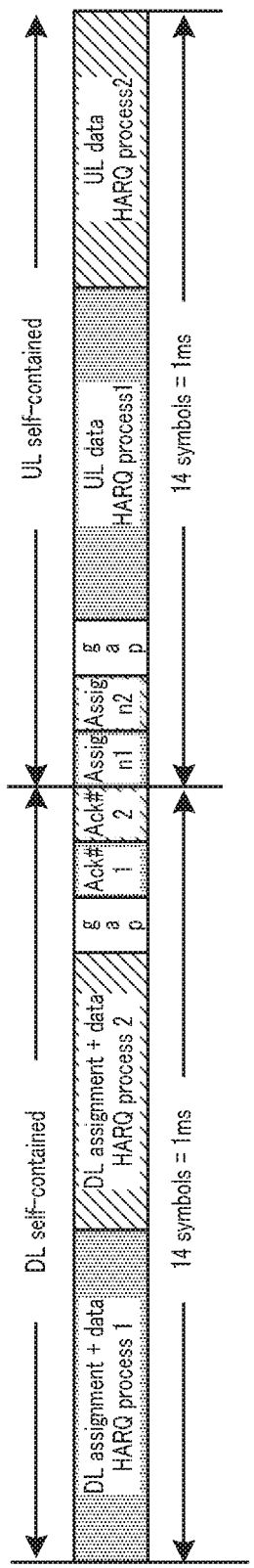
FIG. 17A is a diagram illustrating a time-unit configuration example in a case where a subcarrier interval according to another embodiment is 15 kHz.

For example, FIG. 17A illustrates a time-unit configuration example of a case where a single time unit is defined as a time unit (=1 ms) including 14 symbols (OFDM symbols) where the subcarrier interval is 15 kHz. Meanwhile, FIG. 17B illustrates a time-unit configuration example of a case where a single time unit is defined as a time unit (=0.25 ms) including 14 symbols (OFDM symbols) where the subcarrier interval is 60 kHz.

Figure 17B:
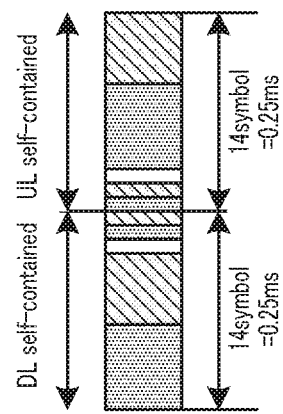
FIG. 17B is a diagram illustrating a time-unit configuration example in a case where a subcarrier interval according to the other embodiment is 60 kHz.

In FIG. 17B (subcarrier interval: 60 kHz), the time length of a single time unit is reduced to ¼ as compared with FIG. 17A (subcarrier interval: 15 kHz), so that the average latency of DL data or UL data can be shortened.

In the time-unit configuration example of FIG. 17B, the switching cycle between a DL self-contained time unit and UL self-contained time unit can be shortened, so that even when there is an imbalance between the uplink and downlink traffic amounts, the radio resource can be efficiently allocated.

(4) The above embodiments have been described with an example in which an aspect of the present disclosure is implemented using a hardware configuration, but the present disclosure may also be implemented by software in cooperation with hardware.

In addition, the functional blocks used in the descriptions of the embodiments are typically implemented as LSI devices, which are integrated circuits having an input and output. The integrated circuits may control the functional blocks used in the descriptions of the embodiments and may include an input and output. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A base station of the present disclosure includes: a transmission section that transmits a downlink signal in a downlink transmission region in a time unit composed of the downlink transmission region, an uplink transmission region, and a gap interval that is a switching point from the downlink transmission region to the uplink transmission region; and a reception section that receives an uplink signal in the uplink transmission region in the time unit, in which the time unit includes the downlink transmission region and the uplink transmission region for each of a plurality of HARQ processes.

In the base station according to the present disclosure, mapping positions of the downlink transmission region and the uplink transmission region for each of the plurality of HARQ processes are fixed in the time unit.

In the base station according to the present disclosure, the uplink transmission region is mapped to an end of the time unit.

In the base station according to the present disclosure, the uplink transmission region corresponding to at least one of the plurality of HARQ processes is mapped to a position at a timing earlier than the downlink transmission region corresponding to the at least one HARQ process in the time unit.

In the base station according to the present disclosure, the time unit includes only one gap interval.

In the base station according to the present disclosure, an HARQ process used by a terminal is determined from among the plurality of HARQ processes in accordance with a processing capability of the terminal.

In the base station according to the present disclosure, the time unit includes a number of the gap intervals that is equal to a number of the plurality of HARQ processes, and the gap interval is mapped between the downlink transmission region and the uplink transmission region for each of the plurality of HARQ processes in the time unit.

In the base station according to the present disclosure, a switching timing between the uplink transmission region and the downlink transmission region in the time unit for downlink data communication coincides with a switching timing between the uplink transmission region and the downlink transmission region in the time unit for uplink data communication.

In the base station according to the present disclosure, the plurality of HARQ processes include: a first configuration in which only one gap interval is included in the time unit; and a second configuration in which a number of the gap intervals that is equal to a number of the plurality of HARQ processes is included in the time unit, and the base station further includes a scheduling section that performs scheduling for a terminal based on the first configuration when a gap length per the gap interval is equal to or greater than a predetermined threshold, and performs scheduling for the terminal based on the second configuration when the gap length is less than the predetermined threshold.

A terminal according to the present disclosure includes: a reception section that receives a downlink signal in a downlink transmission region in a time unit composed of the downlink transmission region, an uplink transmission region, and a gap interval that is a switching point from the downlink transmission region to the uplink transmission region; and a transmission section that transmits an uplink signal in the uplink transmission region in the time unit, in which the time unit includes the downlink transmission region and the uplink transmission region for each of a plurality of HARQ processes.

A communication method according to the present disclosure includes: transmitting a downlink signal in a downlink transmission region in a time unit composed of the downlink transmission region, an uplink transmission region, and a gap interval that is a switching point from the downlink transmission region to the uplink transmission region; and receiving an uplink signal in the uplink transmission region in the time unit, in which the time unit includes the downlink transmission region and the uplink transmission region for each of a plurality of HARQ processes.

A communication method according to the present disclosure includes: receiving a downlink signal in a downlink transmission region in a time unit composed of the downlink transmission region, an uplink transmission region, and a gap interval that is a switching point from the downlink transmission region to the uplink transmission region; and transmitting an uplink signal in the uplink transmission region in the time unit, in which the time unit includes the downlink transmission region and the uplink transmission region for each of a plurality of HARQ processes.

INDUSTRIAL APPLICABILITY

An aspect of this disclosure is useful in mobile communication systems.

REFERENCE SIGNS LIST 100, 300 Base station
101, 203, 301, 401 Time-unit configuration storing section
102, 302 Scheduling section
103, 303 Control-signal generating section
104, 304 Control-signal modulating section
105, 404 Data encoding section
106, 405 Retransmission control section
107, 406 Data modulation section
108, 211, 305, 407 Signal assignment section
109, 212 Transmission section
110, 201 Antenna
111, 202 Reception section
112, 204, 306, 402 Signal extraction section
113 Demodulation and decoding section
114 Determination section
200 Terminal
205, 403 Control-signal demodulation and decoding section
206, 307 Data demodulation section
207 Data decoding section
208, 309 Error detecting section
209 Response-signal generating section
210 Coding and Modulation section The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication apparatus, comprising:
a receiver, which, in operation, receives a downlink signal within a downlink transmission region of a time unit, the time unit including the downlink transmission region, an uplink transmission region, and a switching period for switching from the downlink transmission region to the uplink transmission region; and
a transmitter, which, in operation, transmits an uplink signal within the uplink transmission region of the time unit,
wherein a time interval between the downlink signal and the uplink signal is greater than the switching period, and
wherein:
the time interval is selected from a plurality of time intervals, one of which corresponds to a number of symbols that equals a total number of symbols of the switching period and of a response signal, or
the time interval is selected from the plurality of time intervals, one of which corresponds to a number of symbols that equals a total number of symbols of downlink control information and of the switching period.

2. The communication apparatus according to the claim 1, wherein the downlink signal is a downlink data signal, the uplink signal is the response signal to the downlink data signal.

3. The communication apparatus according to claim 1,
wherein the downlink signal is a first downlink data signal, and the uplink signal is a first response signal to the first downlink data signal, and
wherein the time interval is between the first downlink data signal and the first response signal, and corresponds to a number of symbols that equals a total number of symbols of a second downlink data signal and of the switching period.

4. The communication apparatus according to the claim 1,
wherein the downlink signal is a second downlink data signal, and the uplink signal is a second response signal to the second downlink data signal, and
wherein the time interval is between the second downlink data signal and the second response signal, and corresponds to a number of symbols that equals a total number of symbols of the switching period and of a first response signal to a first downlink data signal.

5. The communication apparatus according to the claim 1,
wherein the downlink signal is the downlink control information, the uplink signal is a uplink data signal indicated by the downlink control information.

6. The communication apparatus according to the claim 1,
wherein the downlink signal is a first downlink control information, and the uplink signal is a first uplink data signal indicated by the first downlink control information, and
wherein the time interval is between the first downlink control information and the first uplink data signal, and corresponds to a number of symbols that equals a total number of symbols of a second downlink control information and of the switching period.

7. The communication apparatus according to the claim 1,
wherein the downlink signal is a second downlink control information, and the uplink signal is a second uplink data signal indicated by the second downlink control information, and
wherein the time interval is between the second downlink control information and the second uplink data signal, and corresponds to a number of symbols that equals a total number of symbols of the switching period and of a first uplink data signal indicated by a first downlink control information.

8. A communication method, comprising:
receiving a downlink signal within a downlink transmission region of a time unit, the time unit including the downlink transmission region, an uplink transmission region, and a switching period for switching from the downlink transmission region to the uplink transmission region; and
transmitting an uplink signal within the uplink transmission region of the time unit,
wherein: a time interval between the downlink signal and the uplink signal is greater than the switching period, and
wherein:
the time interval is selected from a plurality of time intervals, one of which corresponds to a number of symbols that equals a total number of symbols of the switching period and of a response signal, or
the time interval is selected from the plurality of time intervals, one of which corresponds to a number of symbols that equals a total number of symbols of downlink control information and of the switching period.

9. The communication method according to the claim 8, wherein the downlink signal is a downlink data signal, the uplink signal is the response signal to the downlink data signal.

10. The communication method according to claim 8, wherein,
the downlink signal is a first downlink data signal, and the uplink signal is a first response signal to the first downlink data signal, and
the time interval is between the first downlink data signal and the first response signal, and corresponds to a number of symbols that equals a total number of symbols of a second downlink data signal and of the switching period.

11. The communication method according to the claim 9, wherein,
the downlink signal is a second downlink data signal, and the uplink signal is a second response signal to the second downlink data signal, and
the time interval is between the second downlink data signal and the second response signal, and corresponds to a number of symbols that equals a total number of symbols of the switching period and of a first response signal to a first downlink data signal.

12. The communication method according to claim 8, wherein, the downlink signal is the downlink control information, the uplink signal is a uplink data signal indicated by the downlink control information.

13. The communication method according to the claim 8, wherein,
the downlink signal is a first downlink control information, and the uplink signal is a first uplink data signal indicated by the first downlink control information, and
the time interval is between the first downlink control information and the first uplink data signal, and corresponds to a number of symbols that equals a total number of symbols of a second downlink control information and of the switching period.

14. The communication method according to the claim 8, wherein,
- the downlink signal is a second downlink control information, and the uplink signal is a second uplink data signal indicated by the second downlink control information, and
- the time interval is between the second downlink control information and the second uplink data signal, and corresponds to a number of symbols that equals a total number of symbols of the switching period and of a first uplink data signal indicated by a first downlink control information.

* * * * *